(12) United States Patent
Yuan et al.

(10) Patent No.: US 12,309,770 B2
(45) Date of Patent: May 20, 2025

(54) METHODS AND APPARATUS FOR REFERENCE SIGNAL ASSOCIATIONS

(71) Applicant: QUALCOMM Incorporated, San Diego, CA (US)

(72) Inventors: Fang Yuan, Beijing (CN); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 411 days.

(21) Appl. No.: 17/791,807

(22) PCT Filed: Jan. 29, 2021

(86) PCT No.: PCT/CN2021/074301
§ 371 (c)(1),
(2) Date: Jul. 8, 2022

(87) PCT Pub. No.: WO2021/151388
PCT Pub. Date: Aug. 5, 2021

(65) Prior Publication Data
US 2023/0045134 A1    Feb. 9, 2023

(30) Foreign Application Priority Data

Jan. 31, 2020   (WO) ................ PCT/CN2020/074113

(51) Int. Cl.
*H04W 72/1268*   (2023.01)
*H04B 7/06*   (2006.01)
*H04L 5/00*   (2006.01)

(52) U.S. Cl.
CPC ...... *H04W 72/1268* (2013.01); *H04B 7/0639* (2013.01); *H04L 5/0051* (2013.01)

(58) Field of Classification Search
None
See application file for complete search history.

(56) References Cited

U.S. PATENT DOCUMENTS

| 10,404,343 | B2 | 9/2019 | Islam et al. |
| 2016/0323845 | A1 | 11/2016 | Kim et al. |

(Continued)

FOREIGN PATENT DOCUMENTS

| CN | 108111283 A | 6/2018 |
| CN | 109379172 A | 2/2019 |

(Continued)

OTHER PUBLICATIONS

International Search Report and Written Opinion—PCT/CN2020/074113—ISA/EPO—Oct. 28, 2020.

(Continued)

*Primary Examiner* — Angela Nguyen
(74) *Attorney, Agent, or Firm* — ArentFox Schiff LLP

(57) ABSTRACT

Aspects of the present disclosure include methods, apparatuses, and computer readable media for receiving an indicator for uplink transmission indicating at least an association between at least one of one or more first reference signal ports and at least one of one or more second reference signal ports for a plurality of precoding configurations, transmitting, in response to receiving the indicator, a plurality of first reference signals via a plurality of antenna panels using the plurality of precoding configurations, wherein the plurality of first reference signals is associated with the one or more first reference signal ports, and transmitting one or more second reference signals based on the association via the plurality of antenna panels using the plurality of precoding configurations, wherein the one or more second reference signals is associated with the one or more second reference signal ports.

23 Claims, 11 Drawing Sheets

(56) References Cited

U.S. PATENT DOCUMENTS

2018/0227929 A1  8/2018  Yoo et al.
2019/0140729 A1  5/2019  Zhang et al.
2020/0008270 A1  1/2020  Zhang et al.

FOREIGN PATENT DOCUMENTS

WO    2018063823        4/2018
WO    2019161539 A1     8/2019
WO    2019245658 A1    12/2019

OTHER PUBLICATIONS

International Search Report and Written Opinion—PCT/CN2021/074301—ISA/EPO—Apr. 20, 2021.
VIVO: "Discussion on the remaining details on PT-RS", 3GPP TSG RAN WG1 Meeting AH 1801, R1-1800191, Vancouver, Canada, Jan. 22, 2018-Jan. 26, 2018, Jan. 26, 2018 (Jan. 26, 2018), 6 Pages, the whole document.
VIVO: "Remaining issues on PT-RS", 3GPP TSG RAN WG1 Meeting #92bis, Sanya, China, R1-1803824, Apr. 16, 2018-Apr. 20, 2018, Apr. 20, 2018 (Apr. 20, 2018), 9 Pages, the whole document.
ZTE, et al., "Remaining Details on DL DMRS and UL DMRS", 3GPP TSG RAN WG1 Meeting 91, Nov. 27, 2017-Dec. 1, 2017, R1-1719542, Dec. 1, 2017 (Dec. 1, 2017), pp. 1-28, sections 1-3.
CATT: "Remaining Issues on PT-RS", 3GPP TSG RAN WG1 Meeting #92bis, R1-1803748, 3rd Generation Partnership Project, Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 15, 2018, XP051426043, 7 pages, tables 1-6, section 2, p. 2-p. 6.
Supplementary European Search Report—EP21747100—Search Authority—Munich—Feb. 1, 2024.

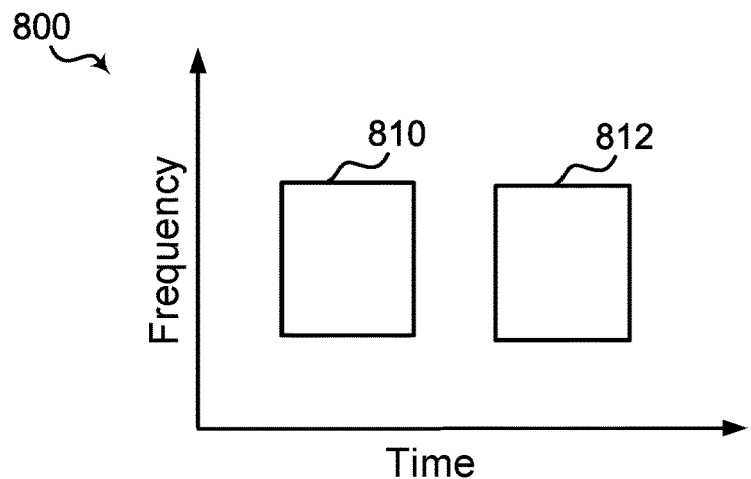
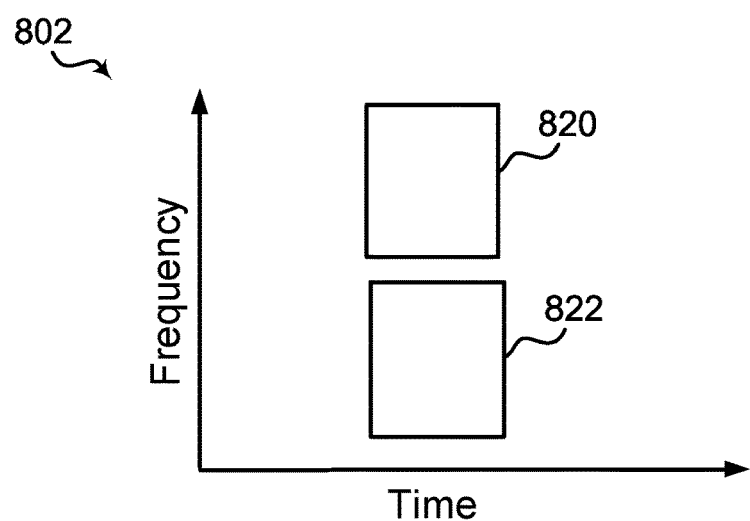
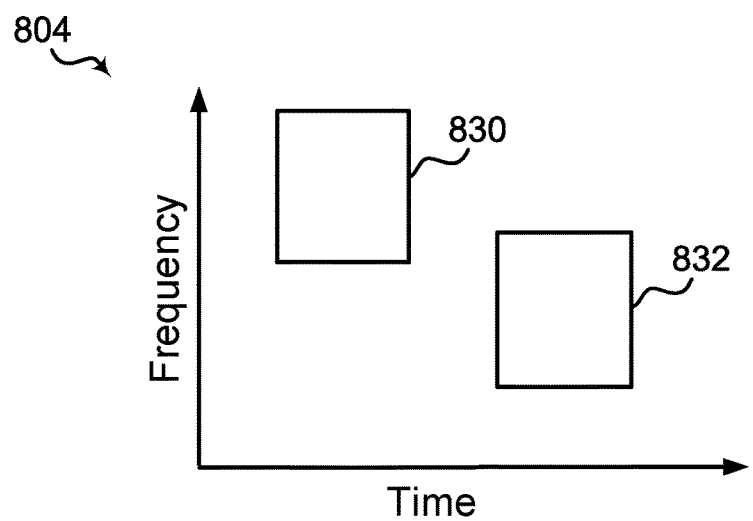
FIG. 8

900

905 — RECEIVING AN INDICATOR FOR UPLINK TRANSMISSION INDICATING AT LEAST AN ASSOCIATION BETWEEN AT LEAST ONE OF ONE OR MORE FIRST REFERENCE SIGNAL PORTS AND AT LEAST ONE OF ONE OR MORE SECOND REFERENCE SIGNAL PORTS FOR A PLURALITY OF PRECODING CONFIGURATIONS

910 — TRANSMITTING, IN RESPONSE TO RECEIVING THE INDICATOR, A PLURALITY OF FIRST REFERENCE SIGNALS BASED ON THE ASSOCIATION VIA A PLURALITY OF ANTENNA PANELS USING THE PLURALITY OF PRECODING CONFIGURATIONS, WHEREIN THE PLURALITY OF FIRST REFERENCE SIGNALS IS ASSOCIATED WITH THE ONE OR MORE FIRST REFERENCE SIGNAL PORTS

915 — TRANSMITTING ONE OR MORE SECOND REFERENCE SIGNALS BASED ON THE ASSOCIATION VIA THE PLURALITY OF ANTENNA PANELS USING THE PLURALITY OF PRECODING CONFIGURATIONS, WHEREIN THE ONE OR MORE SECOND REFERENCE SIGNALS IS ASSOCIATED WITH THE ONE OR MORE SECOND REFERENCE SIGNAL PORTS

1005
TRANSMITTING AN INDICATOR FOR UPLINK TRANSMISSION INDICATING AT LEAST AN ASSOCIATION BETWEEN AT LEAST ONE OF ONE OR MORE FIRST REFERENCE SIGNAL PORTS AND AT LEAST ONE OF ONE OR MORE SECOND REFERENCE SIGNAL PORTS FOR A PLURALITY OF PRECODING CONFIGURATIONS

1010
RECEIVING, IN RESPONSE TO TRANSMITTING THE INDICATOR, A PLURALITY OF FIRST REFERENCE SIGNALS BASED ON THE ASSOCIATION VIA A PLURALITY OF ANTENNA PANELS USING THE PLURALITY OF PRECODING CONFIGURATIONS, WHEREIN THE PLURALITY OF FIRST REFERENCE SIGNALS IS ASSOCIATED WITH THE ONE OR MORE FIRST REFERENCE SIGNAL PORTS

1015
RECEIVING ONE OR MORE SECOND REFERENCE SIGNALS BASED ON THE ASSOCIATION VIA THE PLURALITY OF ANTENNA PANELS USING THE PLURALITY OF PRECODING CONFIGURATIONS, WHEREIN THE ONE OR MORE SECOND REFERENCE SIGNALS IS ASSOCIATED WITH THE ONE OR MORE SECOND REFERENCE SIGNAL PORTS

RECEIVING AN INDICATOR FOR A PLURALITY OF UPLINK TRANSMISSIONS INDICATING AT LEAST AN ASSOCIATION BETWEEN AT LEAST ONE OF ONE OR MORE REFERENCE SIGNAL PORTS AND THE PLURALITY OF UPLINK TRANSMISSIONS

1110

TRANSMITTING, IN RESPONSE TO RECEIVING THE INDICATOR, A PLURALITY OF REFERENCE SIGNALS BASED ON THE ASSOCIATION VIA A PLURALITY OF ANTENNA PANELS USING A PLURALITY OF PRECODING CONFIGURATIONS, WHEREIN THE PLURALITY OF REFERENCE SIGNALS IS ASSOCIATED WITH THE ONE OR MORE REFERENCE SIGNAL PORTS

*FIG. 11*

METHODS AND APPARATUS FOR REFERENCE SIGNAL ASSOCIATIONS

CROSS REFERENCE TO RELATED APPLICATIONS

The current application is a 35 U.S.C. § 371 National Phase of International Patent Application No. PCT/CN2021/074301, entitled "METHODS AND APPARATUS FOR REFERENCE SIGNAL ASSOCIATIONS" filed Jan. 29, 2021, which claims priority to PCT Application No. PCT/CN2020/074113, entitled "METHODS AND APPARATUS FOR REFERENCE SIGNAL ASSOCIATIONS" filed on Jan. 31, 2020, the contents of which are hereby incorporated by reference in their entireties.

BACKGROUND

Aspects of the present disclosure relate generally to wireless communications, and more particularly, to apparatuses and methods for associating a first type of reference signals with a second type of reference signals in multiple-input multiple-output (MIMO) antenna communication technology.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

In a wireless communication network, a base station (BS) and a user equipment (UE) may communicate via multiple antenna panels. Reference signals may be utilized to improve the states, reception, and/or transmission of the uplink and/or downlink channels. However, depending on the modulation scheme used, various configurations and/or associations for the reference signals may be utilized for transmission and/or reception by the BS and/or the UE. Therefore, an improvement in associating reference signals may be desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include methods for receiving an indicator for uplink transmission indicating at least an association between at least one of one or more first reference signal ports and at least one of one or more second reference signal ports for a plurality of precoding configurations, transmitting, in response to receiving the indicator, a plurality of first reference signals based on the association via a plurality of antenna panels using the plurality of precoding configurations, wherein the plurality of first reference signals is associated with the one or more first reference signal ports, and transmitting one or more second reference signals based on the association via the plurality of antenna panels using the plurality of precoding configurations, wherein the one or more second reference signals is associated with the one or more second reference signal ports.

Other aspects of the present disclosure include a UE having a memory comprising instructions, a transceiver, and one or more processors operatively coupled with the memory and the transceiver, the one or more processors configured to execute instructions in the memory to receive, via the transceiver, an indicator for uplink transmission indicating at least an association between at least one of one or more first reference signal ports and at least one of one or more second reference signal ports for a plurality of precoding configurations, transmit, via the transceiver, in response to receiving the indicator, a plurality of first reference signals based on the association via a plurality of antenna panels using the plurality of precoding configurations, wherein the plurality of first reference signals is associated with the one or more first reference signal ports, and transmit, via the transceiver, one or more second reference signals based on the association via the plurality of antenna panels using the plurality of precoding configurations, wherein the one or more second reference signals is associated with the one or more second reference signal ports.

An aspect of the present disclosure includes a UE including means for receiving an indicator for uplink transmission indicating at least an association between at least one of one or more first reference signal ports and at least one of one or more second reference signal ports for a plurality of precoding configurations, means for transmitting, in response to receiving the indicator, a plurality of first reference signals based on the association via a plurality of antenna panels using the plurality of precoding configurations, wherein the plurality of first reference signals is associated with the one or more first reference signal ports, and means for transmitting one or more second reference signals based on the association via the plurality of antenna panels using the plurality of precoding configurations, wherein the one or more second reference signals is associated with the one or more second reference signal ports.

Some aspects of the present disclosure include non-transitory computer readable media having instructions stored therein that, when executed by one or more processors of a UE, cause the one or more processors to receive an indicator for uplink transmission indicating at least an association between at least one of one or more first reference signal ports and at least one of one or more second reference signal ports for a plurality of precoding configurations, transmit, in response to receiving the indicator, a plurality of first reference signals based on the association via a plurality of antenna panels using the plurality of precoding configurations, wherein the plurality of first reference signals is associated with the one or more first reference signal ports, and transmit one or more second reference signals based on the association via the plurality of antenna panels using the plurality of precoding configurations, wherein the one or more second reference signals is associated with the one or more second reference signal ports.

In an aspect, a method includes transmitting an indicator for uplink transmission indicating at least an association between at least one of one or more first reference signal ports and at least one of one or more second reference signal ports for a plurality of precoding configurations, receiving, in response to transmitting the indicator, a plurality of first reference signals based on the association via a plurality of antenna panels using the plurality of precoding configurations, wherein the plurality of first reference signals is associated with the one or more first reference signal ports, and receiving one or more second reference signals based on the association via the plurality of antenna panels using the plurality of precoding configurations, wherein the one or more second reference signals is associated with the one or more second reference signal ports.

Other aspects of the present disclosure include a UE having a memory comprising instructions, a transceiver, and one or more processors operatively coupled with the memory and the transceiver, the one or more processors configured to execute instructions in the memory to transmit an indicator for uplink transmission indicating at least an association between at least one of one or more first reference signal ports and at least one of one or more second reference signal ports for a plurality of precoding configurations, receive, in response to transmitting the indicator, a plurality of first reference signals based on the association via a plurality of antenna panels using the plurality of precoding configurations, wherein the plurality of first reference signals is associated with the one or more first reference signal ports, and receive one or more second reference signals based on the association via the plurality of antenna panels using the plurality of precoding configurations, wherein the one or more second reference signals is associated with the one or more second reference signal ports.

An aspect of the present disclosure includes a UE including means for transmitting an indicator for uplink transmission indicating at least an association between at least one of one or more first reference signal ports and at least one of one or more second reference signal ports for a plurality of precoding configurations, means for receiving, in response to transmitting the indicator, a plurality of first reference signals based on the association via a plurality of antenna panels using the plurality of precoding configurations, wherein the plurality of first reference signals is associated with the one or more first reference signal ports, and means for receiving one or more second reference signals based on the association via the plurality of antenna panels using the plurality of precoding configurations, wherein the one or more second reference signals is associated with the one or more second reference signal ports.

Some aspects of the present disclosure include non-transitory computer readable media having instructions stored therein that, when executed by one or more processors of a UE, cause the one or more processors to transmit an indicator for uplink transmission indicating at least an association between at least one of one or more first reference signal ports and at least one of one or more second reference signal ports for a plurality of precoding configurations, receive, in response to transmitting the indicator, a plurality of first reference signals based on the association via a plurality of antenna panels using the plurality of precoding configurations, wherein the plurality of first reference signals is associated with the one or more first reference signal ports, and receive one or more second reference signals based on the association via the plurality of antenna panels using the plurality of precoding configurations, wherein the one or more second reference signals is associated with the one or more second reference signal ports.

In an aspect, a method includes receiving an indicator for a plurality of uplink transmissions indicating at least an association between at least one of one or more reference signal ports and the plurality of uplink transmissions and transmitting, in response to receiving the indicator, a plurality of reference signals based on the association via a plurality of antenna panels using a plurality of precoding configurations, wherein the plurality of reference signals is associated with the one or more reference signal ports.

Other aspects of the present disclosure include a UE having a memory comprising instructions, a transceiver, and one or more processors operatively coupled with the memory and the transceiver, the one or more processors configured to execute instructions in the memory to receive an indicator for a plurality of uplink transmissions indicating at least an association between at least one of one or more reference signal ports and the plurality of uplink transmissions and transmit, in response to receiving the indicator, a plurality of reference signals based on the association via a plurality of antenna panels using a plurality of precoding configurations, wherein the plurality of reference signals is associated with the one or more reference signal ports.

An aspect of the present disclosure includes a UE including means for receiving an indicator for a plurality of uplink transmissions indicating at least an association between at least one of one or more reference signal ports and the plurality of uplink transmissions and means for transmitting, in response to receiving the indicator, a plurality of reference signals based on the association via a plurality of antenna panels using a plurality of precoding configurations, wherein the plurality of reference signals is associated with the one or more reference signal ports.

Some aspects of the present disclosure include non-transitory computer readable media having instructions stored therein that, when executed by one or more processors of a UE, cause the one or more processors to receive an indicator for a plurality of uplink transmissions indicating at least an association between at least one of one or more reference signal ports and the plurality of uplink transmissions and transmit, in response to receiving the indicator, a plurality of reference signals based on the association via a plurality of antenna panels using a plurality of precoding configurations, wherein the plurality of reference signals is associated with the one or more reference signal ports.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 8 is a schematic diagram of examples of non-codebook based multiple panel transmissions;

FIG. 9 is a process flow diagram of an example of a method for associating reference signals by the UE;

FIG. 10 is a process flow diagram of an example of a method for associating reference signals by the BS; and FIG. 11 is a process flow diagram of an example of a method for associating reference signals with transmissions during non-codebook based transmissions.

DETAILED DESCRIPTION

Figure 1:
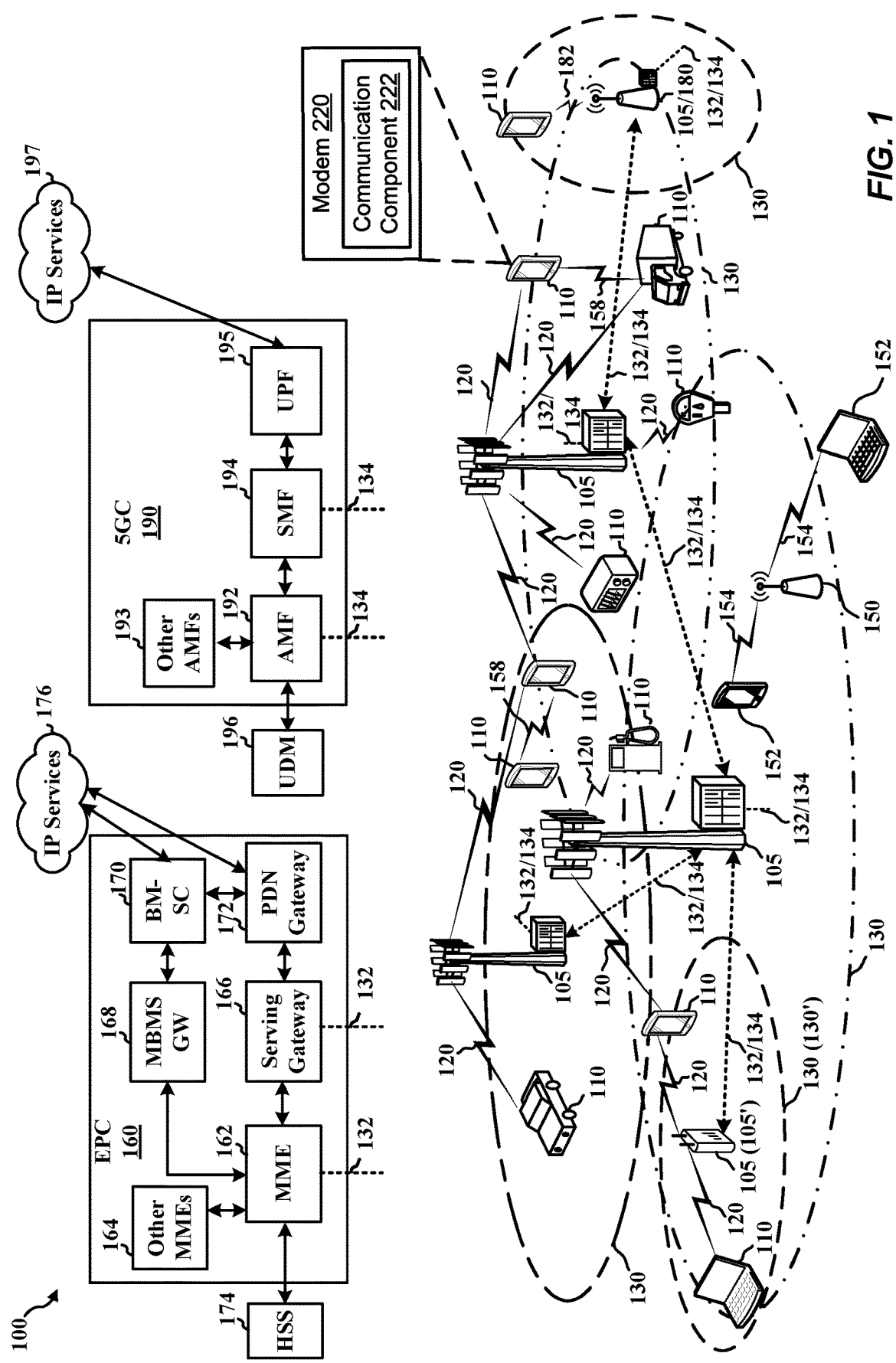
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In an implementation, a UE may transmit information using a plurality of antenna panels. For each layer of uplink transmission, the UE may utilize a demodulation reference signal port to configure and/or transmit the demodulation reference signals. For each antenna panel, the UE may utilize a phase tracking reference signal port to configure and/or transmit the phase tracking reference signals. However, during uplink transmissions based on multiple layers and multiple antenna panels, the UE has more than one combination of associations between the demodulation reference signal port and the phase tracking reference signal port. In an aspect of the present disclosure, the BS transmits two or more bits to the UE to indicate the association. In the current application, the term "reference signal port" may be used interchangeability with the term "reference signal port index." A reference signal port index may specify a plurality of predetermined time-frequency resources to be used for transmitting the corresponding reference signals.

FIG. 1 is a diagram illustrating an example of a wireless communications system and an access network 100. The wireless communications system (also referred to as a wireless wide area network (WWAN)) includes at least one BS 105, UEs 110, an Evolved Packet Core (EPC) 160, and a 5G Core (5GC) 190. The BS 105 may include macro cells (high power cellular base station) and/or small cells (low power cellular base station). The macro cells include base stations. The small cells include femtocells, picocells, and microcells. In one implementation, the UE 110 may include a communication component 222. The communication component 222 and/or a modem 220 of the UE 110 may be configured to communicate with the BS 105 via a cellular network, a Wi-Fi network, or other wireless and wired networks. In some implementations, the BS 105 may include a communication component 322 configured to communicate with the UE 110.

A BS 105 configured for 4G LTE (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A BS 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the BS 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The BS 105 may communicate directly or indirectly (e.g., through the EPC 160 or 5GC 190) with each other over the backhaul links interfaces 134. The backhaul links 132, 134 may be wired or wireless.

The BS 105 may wirelessly communicate with the UEs 110. Each of the BS 105 may provide communication coverage for a respective geographic coverage area 130. There may be overlapping geographic coverage areas 130. For example, the small cell 105' may have a coverage area 130' that overlaps the coverage area 130 of one or more macro BS 105. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the BS 105 and the UEs 110 may include uplink (UL) (also referred to as reverse link) transmissions from a UE 110 to a BS 105 and/or downlink (DL) (also referred to as forward link) transmissions from a BS 105 to a UE 110. The communication links 120 may use multiple-input and multiple-output (MIMO) antenna technology, including spatial multiplexing, beamforming, and/or transmit diversity. The communication links may be through one or more carriers. The BS 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A BS 105, whether a small cell 105' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 110. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the BS 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The BS 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The BS 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
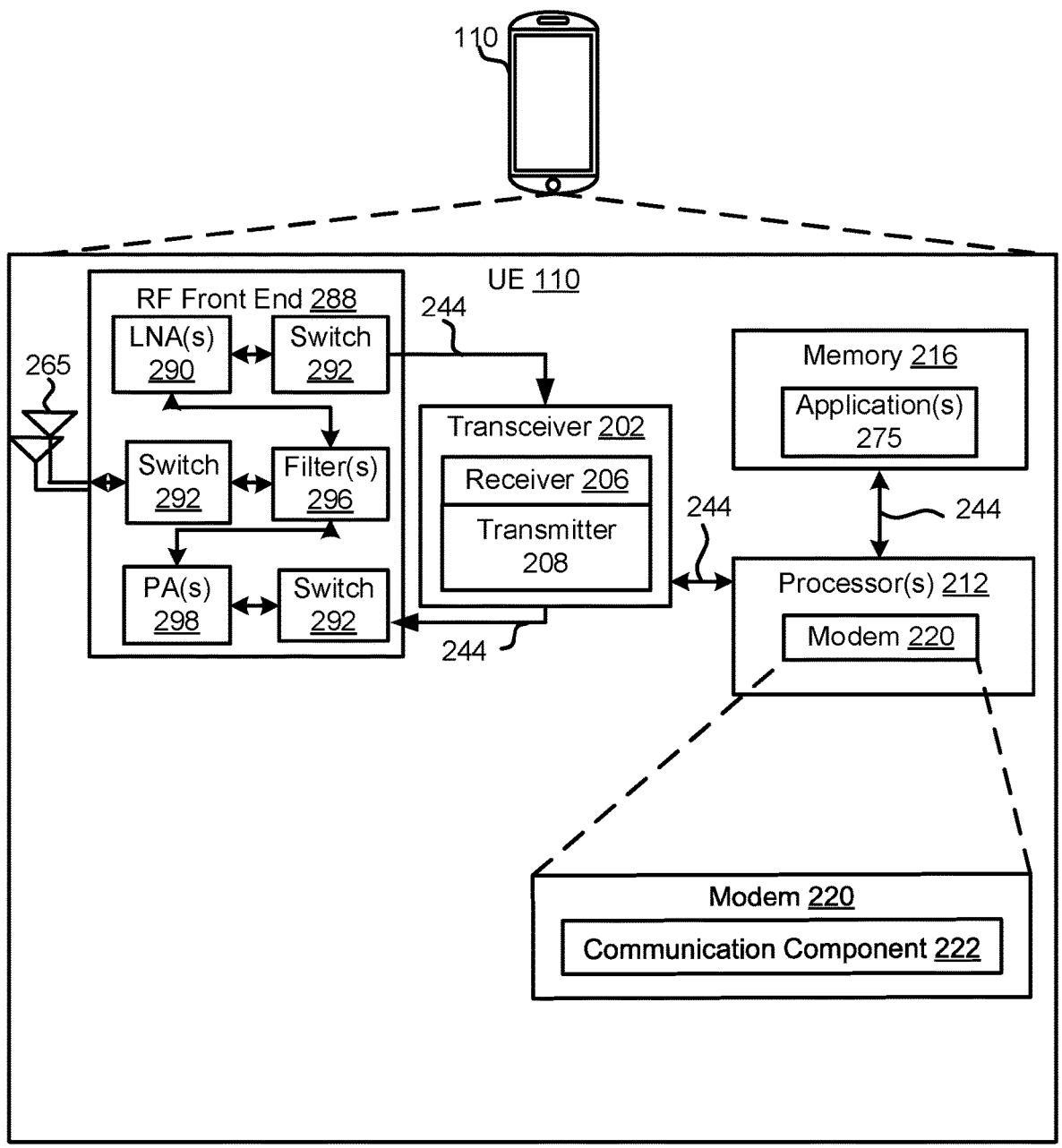
FIG. 2 is a schematic diagram of an example of a user equipment.

Referring to FIG. 2, one example of an implementation of the UE 110 may include a modem 220 having a communication component 222. The communication component 222 and/or the modem 220 of the UE 110 may be configured to communicate with the BS 105 via a cellular network, a Wi-Fi network, or other wireless and wired networks.

In some implementations, the UE 110 may include a variety of components, including components such as one or more processors 212 and memory 216 and transceiver 202 in communication via one or more buses 244, which may operate in conjunction with the modem 220 and the communication component 222 to enable one or more of the functions described herein related to communicating with the BS 105. Further, the one or more processors 212, modem 220, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements, and/or antenna arrays.

In an aspect, the one or more processors 212 may include the modem 220 that uses one or more modem processors. The various functions related to the communication component 222 may be included in the modem 220 and/or processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 220 may configure the UE 110 along with the processors 212. In other aspects, some of the features of the one or more processors 212 and/or the modem 220 associated with the communication component 222 may be performed by transceiver 202.

Also, memory 216 may be configured to store data used herein and/or local versions of applications 275 or the communication component 222 and/or one or more subcomponents of the communication component 222 being executed by at least one processor 212. Memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining the communication component 222 and/or one or more of its subcomponents, and/or data associated therewith, when UE 110 is operating at least one processor 212 to execute the communication component 222 and/or one or more of the subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a RF receiving device. In an aspect, the receiver 206 may receive signals transmitted by at least one BS 105. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 110 may include RF front end 288, which may operate in communication with one or more antennas 265 and transceiver 202 for receiving and transmitting radio transmissions, for example, wireless communications transmitted by at least one BS 105 or wireless transmissions transmitted by UE 110. RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, LNA 290 may amplify a received signal at a desired output level. In an aspect, each LNA 290 may have a specified minimum and maximum gain values. In an aspect, RF front end 288 may use one or more switches 292 to select a particular LNA 290 and the specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and the specified gain value based on a desired gain value for a particular application.

Also, for example, one or more filters 296 may be used by RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, RF front end 288 may use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 110 may communicate with, for example, one or more BS 105 or one or more cells associated with one or more BS 105. In an aspect, for example, the modem 220 may configure transceiver 202 to operate at a specified frequency and power level based on the UE configuration of the UE 110 and the communication protocol used by the modem 220.

In an aspect, the modem 220 may be a multiband-multimode modem, which may process digital data and communicate with transceiver 202 such that the digital data is sent and received using transceiver 202. In an aspect, the modem 220 may be multiband and be configured to support multiple frequency bands for a specific communications protocol. In an aspect, the modem 220 may be multimode and be configured to support multiple operating networks and communications protocols. In an aspect, the modem 220 may control one or more components of UE 110 (e.g., RF front end 288, transceiver 202) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network.

Figure 3:
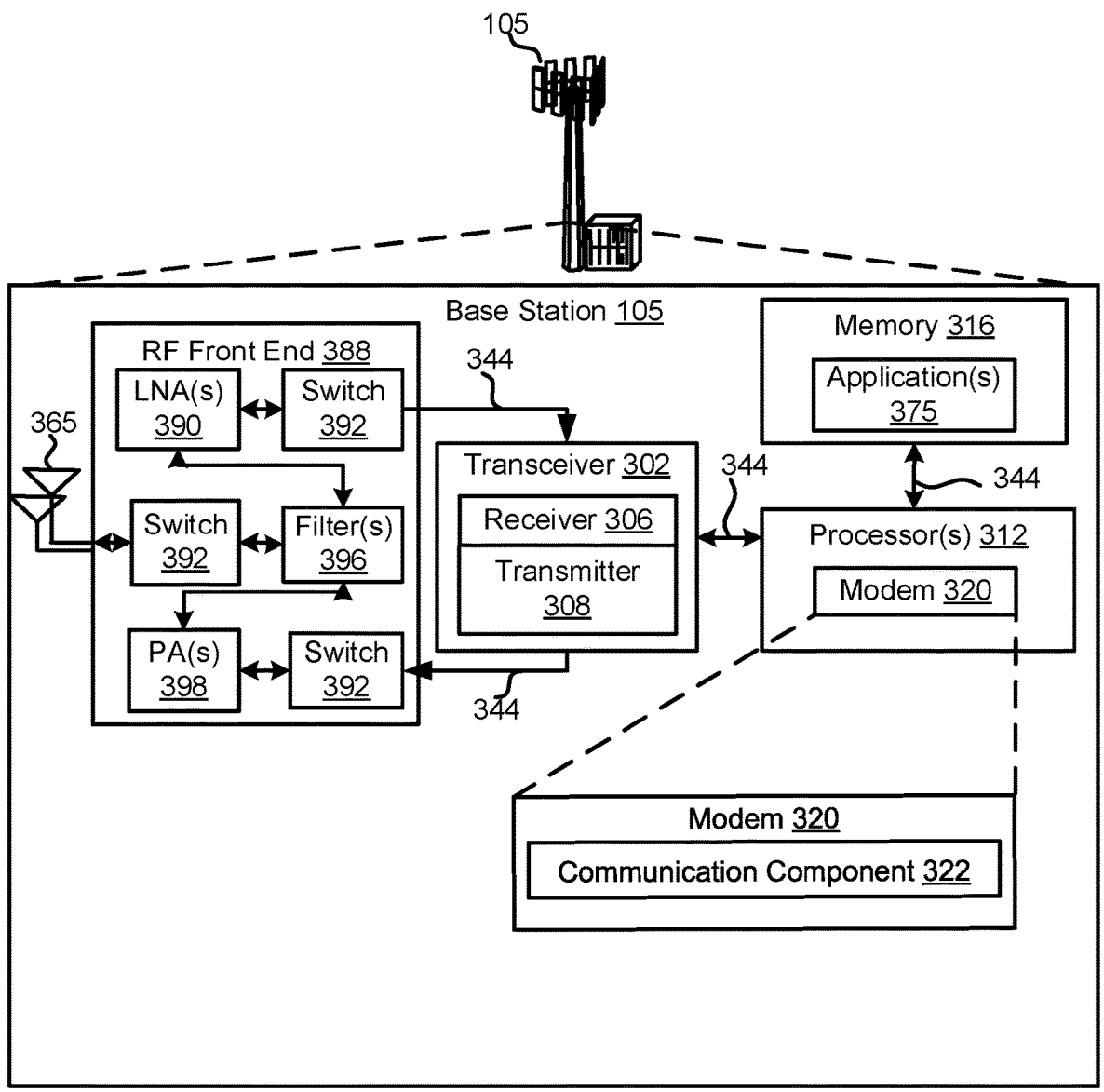
FIG. 3 is a schematic diagram of an example of a base station.

Referring to FIG. 3, one example of an implementation of the BS 105 may include a modem 320 with a communication component 322 configured to transmit data. The communication component 322 and/or the modem 320 the BS 105 may be configured to communicate with the UE 110 via a cellular network, a Wi-Fi network, or other wireless and wired networks.

In some implementations, the BS 105 may include a variety of components, including components such as one or more processors 312 and memory 316 and transceiver 302 in communication via one or more buses 344, which may operate in conjunction with the modem 320 and the communication component 322 to enable one or more of the functions described herein related to communicating with the UE 110. Further, the one or more processors 312, modem 320, memory 316, transceiver 302, RF front end 388 and one or more antennas 365, may be configured to support voice and/or data calls (simultaneously or non-simultaneously) in one or more radio access technologies. The one or more antennas 365 may include one or more antennas, antenna elements, and/or antenna arrays.

In an aspect, the one or more processors 312 may include the modem 320 that uses one or more modem processors. The various functions related to the communication component 322 may be included in the modem 320 and/or processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with transceiver 302. Additionally, the modem 320 may configure the BS 105 and processors 312. In other aspects, some of the features of the one or more processors 312 and/or the modem 320 associated with the communication component 322 may be performed by transceiver 302.

Also, memory 316 may be configured to store data used herein and/or local versions of applications 375 or the communication component 322 and/or one or more subcomponents of the communication component 322 being executed by at least one processor 312. Memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining the communication component 322 and/or one or more of its subcomponents, and/or data associated therewith, when the BS 105 is operating at least one processor 312 to execute the communication component 322 and/or one or more of the subcomponents.

Transceiver 302 may include at least one receiving device 306 and at least one transmitter 308. The at least one receiving device 306 may include hardware, firmware, and/or software code executable by a processor for receiving data, the code comprising instructions and being stored in a memory (e.g., computer-readable medium). Receiving device 306 may be, for example, a RF receiving device. In an aspect, receiving device 306 may receive signals transmitted by the UE 110. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, the BS 105 may include RF front end 388, which may operate in communication with one or more antennas 365 and transceiver 302 for receiving and transmitting radio transmissions, for example, wireless communications transmitted by other BS 105 or wireless transmissions transmitted by UE 110. RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, LNA 390 may amplify a received signal at a desired output level. In an aspect, each LNA 390 may have a specified minimum and maximum gain values. In an aspect, RF front end 388 may use one or more switches 392 to select a particular LNA 390 and the specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and the specified gain value based on a desired gain value for a particular application.

Also, for example, one or more filters 396 may be used by RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, RF front end 388 may use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that BS 105 may communicate with, for example, the UE 110 or one or more cells associated with one or more BS 105. In an aspect, for example, the modem 320 may configure transceiver 302 to operate at a specified frequency and power level based on the base station configuration of the BS 105 and the communication protocol used by the modem 320.

In an aspect, the modem 320 may be a multiband-multimode modem, which may process digital data and communicate with transceiver 302 such that the digital data is sent and received using transceiver 302. In an aspect, the modem 320 may be multiband and be configured to support multiple frequency bands for a specific communications protocol. In an aspect, the modem 320 may be multimode and be configured to support multiple operating networks and communications protocols. In an aspect, the modem 320 may control one or more components of the BS 105 (e.g., RF front end 388, transceiver 302) to enable transmission and/or reception of signals from the network based on a specified modem configuration. In an aspect, the modem configuration may be based on the mode of the modem and the frequency band in use. In another aspect, the modem configuration may be based on base station configuration associated with the BS 105.

Figure 4:
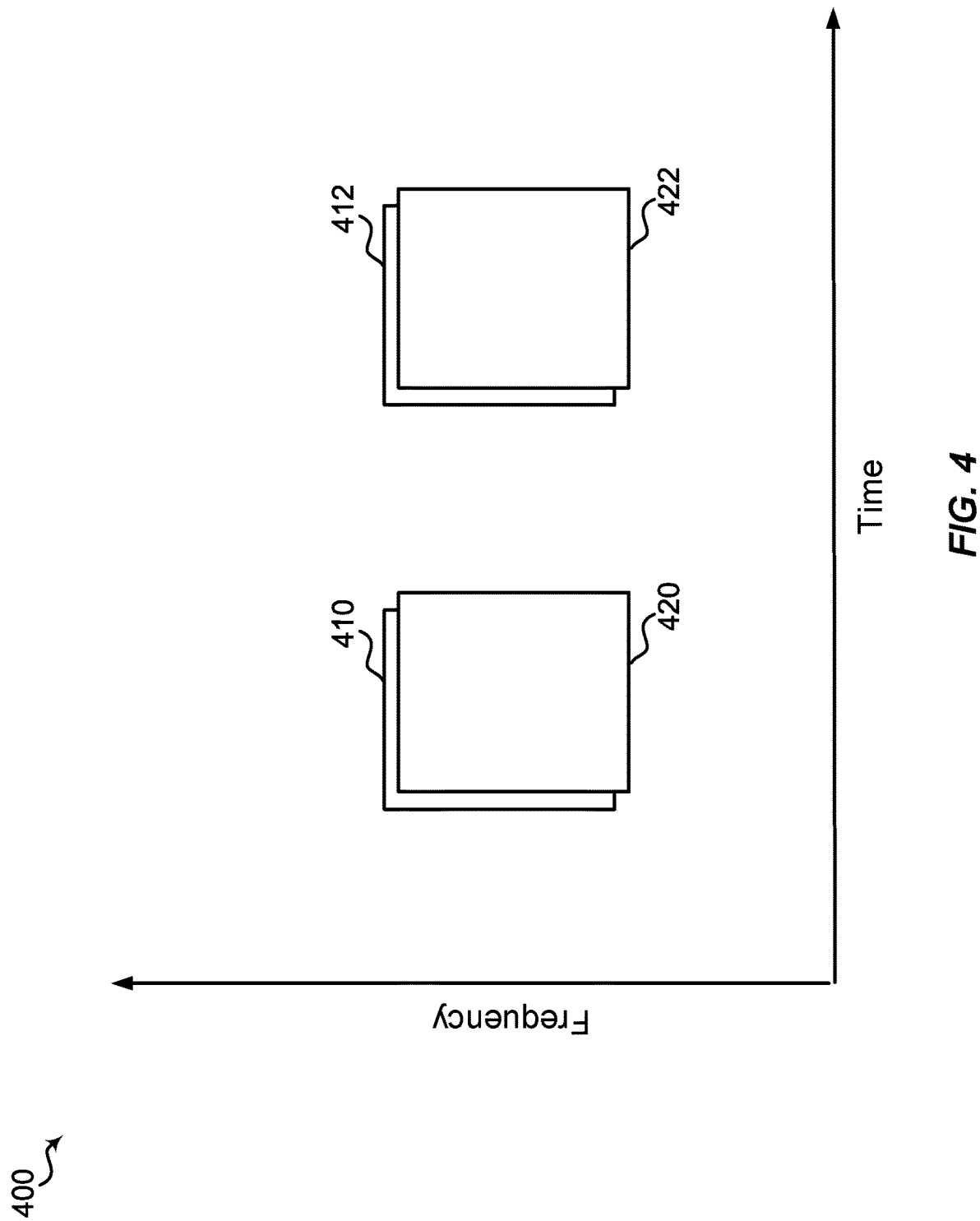
FIG. 4 is schematic diagram of an example of a codebook based time division multiplexing (TDM) multiple panel transmission.

Referring now to FIG. 4, in an example of a codebook based time division multiplexing (TDM) multiple panel transmission 400, two bits may be used to indicate the phase tracking reference signal port association. For example, the two bits may be in the uplink DCI scheduling the same uplink transmissions. In some implementations, the UE 110 may transmit a first uplink transmission 410 and a second uplink transmission 412 based on, e.g., the uplink DCI scheduling. The first uplink transmission 410 and the second uplink transmission 412 may be multiplexed in the time domain. The UE 110 may transmit the first uplink transmission 410 via a first antenna group or antenna panel and the second uplink transmission 412 via a second antenna group or antenna panel. The UE 110 may transmit the first uplink transmission 410 based on a first transmit precoding matrix indicator (TPMI) indicated in the DCI. The first TPMI may be associated with digital precoding of the information in the first uplink transmission 410. The UE 110 may transmit the second uplink transmission 412 based on a second TPMI indicated in the DCI. The second TPMI may be associated with digital precoding of the information in the second uplink transmission 412.

In some instances, the first uplink transmission 410 and the second uplink transmission 412 may be in a first layer in the, e.g., uplink DCI scheduling. The UE 110 may transmit the first uplink transmission 410 using a first layer precoder in the first TPMI. The UE 110 may transmit the second uplink transmission 412 using the first layer precoder in the second TPMI. The UE 110 may transmit the first uplink transmission 410 and the second uplink transmission 412 with a first reference signal port based on, e.g., the uplink DCI scheduling, such as a demodulation reference signal (DMRS) port 0. A DMRS port index specifies a plurality of predetermined time-frequency resources to be used for transmitting the corresponding DMRS. The first reference signal port may include the configuration information associated with the demodulation reference signals. The UE 110 may configure the first uplink transmission 410 and the second uplink transmission 412 with a second reference signal port, such as the phase tracking reference signal (PTRS) port 0. A PTRS port index specifies a plurality of predetermined time-frequency resources to be used for transmitting the corresponding PTRS. The second reference signal port may include the configuration information associated with the phase tracking reference signals for both the first and second antenna group or antenna panels.

In an aspect, the UE 110 may transmit a third uplink transmission 420 and a fourth uplink transmission 422, in addition to the first uplink transmission 410 and the second uplink transmission 412, based on the uplink DCI scheduling. The third uplink transmission 420 and the fourth uplink transmission 422 may be multiplexed in the time domain. The UE 110 may transmit the third uplink transmission 420 via the first antenna group or antenna panel and the fourth uplink transmission 422 via the second antenna group or antenna panel. The UE 110 may transmit the third uplink transmission 420 based on the first TPMI indicated, e.g., in the DCI. The first TPMI may be associated with digital precoding of the information in the third uplink transmission 420. The UE 110 may transmit the fourth uplink transmission 422 based on the second TPMI indicated in the DCI. The second TPMI may be associated with digital precoding of the information in the fourth uplink transmission 422.

In some instances, the third uplink transmission 420 and the fourth uplink transmission 422 may be in a second layer scheduled by, e.g., the uplink DCI. The UE 110 may transmit the third uplink transmission 420 using a second-layer precoder in the first TPMI. The UE 110 may transmit the fourth uplink transmission 422 using a second-layer precoder in the second TPMI. For example, the uplink DCI may schedule a two-layer transmission for two PUSCH time occasions, where a two-layer transmission is in the first PUSCH time occasion and a two-layer transmission is in the second PUSCH time occasion. Each of the two PUSCH occasions may be indicated by the DCI with a TPMI and a transmit beam (uplink TCI or spatial relation). The first uplink transmission 410 and a third uplink transmission 420 are respectively the first layer and second layer of the two-layer transmission in the first PUSCH time occasion based on the first TPMI of two layers. The second uplink transmission 412 and a fourth uplink transmission 422 are respectively the first layer and second layer of the two-layer transmission in the second PUSCH time occasion based on the second TPMI of two layers. The UE 110 may transmit the third uplink transmission 420 and the fourth uplink transmission 422 using a third reference signal port based on the DCI indication, such as the DMRS port 1. The third reference signal port may include the configuration information associated with the demodulation reference signals.

The UE 110 may configure the third uplink transmission 420 and the fourth uplink transmission 422 with the second reference signal port, such as the PTRS port. The second reference signal port may include the configuration information associated with the phase tracking reference signals for both the first and second antenna group or antenna panels.

In one aspect of the present disclosure, prior to the transmission, the BS 105 may transmit a control indicator (e.g., downlink control indicator (DCI) or transmission control indicator (TCI)) to the UE 110 to signal the association(s) among the first reference signal port, the second reference signal port, and/or the third reference signal port. In certain implementations, the indicator may include a transmission rank indicator (TM) indication, a DMRS antenna port indication, and a PTRS-DMRS association indication. The TRI indication may indicate whether a scheduled PUSCH occasion is a one-layer or two-layer transmission. The DMRS antenna port indication may indicate which DMRS ports are used for the layers in the scheduled uplink (e.g., PUSCH) occasions. The PTRS-DRMS association indication may indicate which DMRS port in one PUSCH occasion is associated with the PTRS. For example, since there may not be a separate indicator for the precoder of PTRS, the PTRS (when associated with a DMRS port) may be transmitted with the same precoder as the DMRS port in one uplink (e.g., PUSCH) occasion.

In one non-limiting example, the control indicator may include two bits for the PTRS-DRMS association indication, which contains a most significant bit (MSB) and a least significant bit (LSB). If the TRI indicates a one-layer transmission for each PUSCH time occasion, any value of first bit of the two bits (e.g., MSB) for PTRS-DMRS association indication may indicate that the first reference signal port is associated with the second reference signal port for the first uplink (e.g., PUSCH) time occasion using the first TMPI. Any value of second bit of the two bits (e.g., LSB) may indicate that the first reference signal port is associated with the second reference signal port for the second uplink (e.g., PUSCH) time occasion using the second TMPI. If the TRI indicates a two-layer transmission for each uplink (e.g., PUSCH) time occasion, a first value of the first bit (e.g., MSB=1) may indicate that the first reference signal port is associated with the second reference signal port for the first uplink (e.g., PUSCH) time occasion using the first TMPI. A second value of the first bit (e.g., MSB=0) may indicate that the third reference signal port is associated with the second reference signal port for the first uplink (e.g., PUSCH) time occasion using for the first TMPI. A first value of the second bit (e.g., LSB=1) may indicate that the first reference signal port is associated with the second reference signal port for the second uplink (e.g., PUSCH) time occasion using the second TMPI. A second value of the second bit (e.g., LSB=0) may indicate that the third reference signal port is associated with the second reference signal port the second uplink (e.g., PUSCH) time occasion using for the second TMPI.

In some variations, the first uplink transmission 410 and the third uplink transmission 420 may partially or completely overlap in time and frequency. The second uplink transmission 412 and the fourth uplink transmission 422 may partially or completely overlap in time and frequency. For the codebook based TDM multiple panel transmission 400, one or more PTRS port may be supported.

Figure 5:
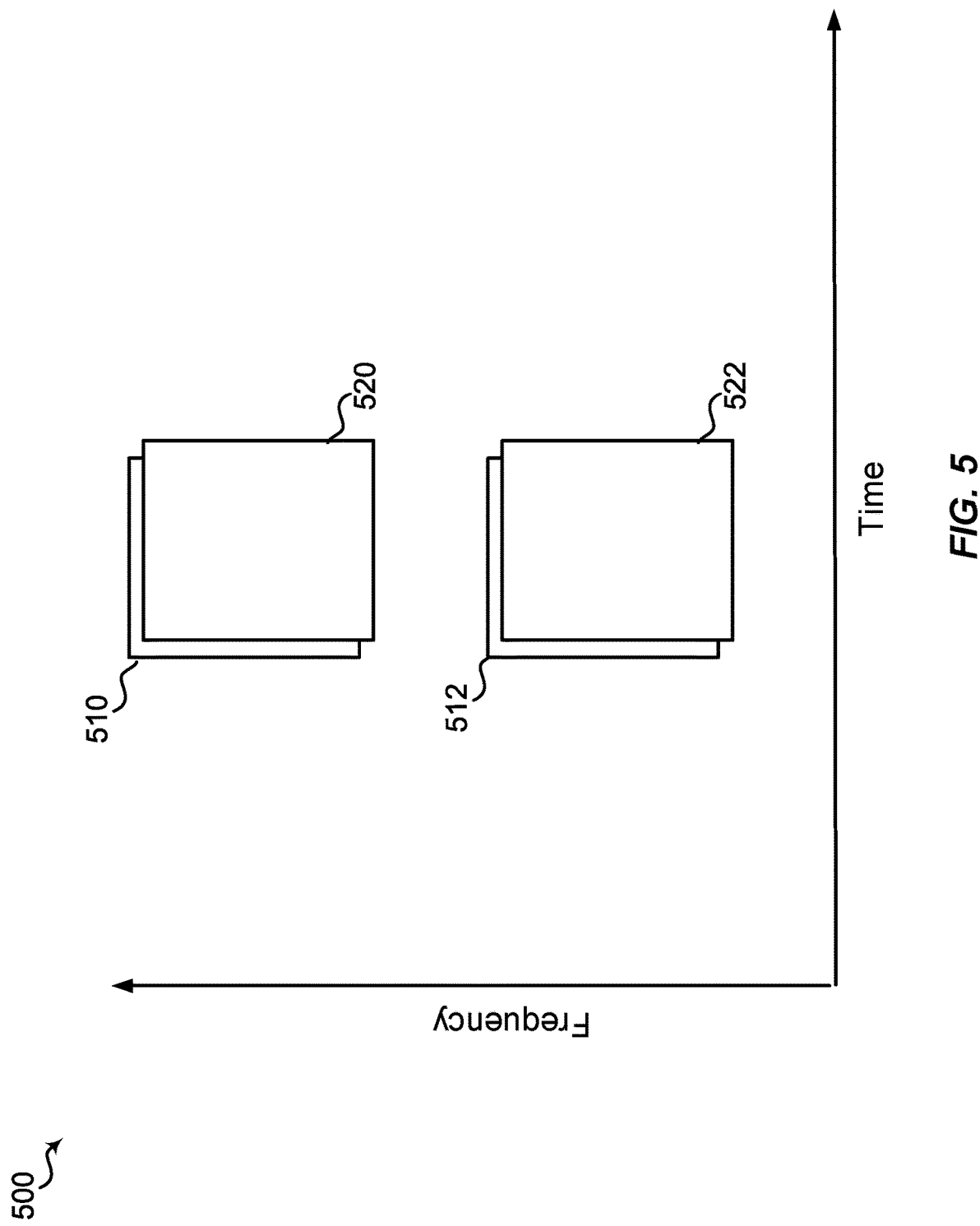
FIG. 5 is a schematic diagram of an example of a codebook based frequency division multiplexing (FDM) multiple panel transmission.

Turning now to FIG. 5, in an example of a codebook based frequency division multiplexing (FDM) multiple panel transmission 500, two bits may be used to indicate the phase tracking reference signal port association. For example, the two bits may be in the uplink DCI scheduling the same uplink transmissions. In some implementations, the UE 110 may transmit a first uplink transmission 510 and a second uplink transmission 512 based on, e.g., the uplink DCI scheduling. The first uplink transmission 510 and the second uplink transmission 512 may be multiplexed in the frequency domain. The UE 110 may transmit the first uplink transmission 510 via a first antenna group or antenna panel and the second uplink transmission 512 via a second antenna group or antenna panel. The UE 110 may transmit the first uplink transmission 510 based on a first TPMI indicated in the DCI. The first TPMI may be associated with digital precoding of the information in the first uplink transmission 510. The UE 110 may transmit the second uplink transmission 512 based on a second TPMI indicated in the DCI. The second TPMI may be associated with digital precoding of the information in the second uplink transmission 512.

In some instances, the first uplink transmission 510 and the second uplink transmission 512 may be in a first layer in the, e.g., uplink DCI scheduling. The UE 110 may transmit the first uplink transmission 510 using a first-layer precoder in the first TPMI. The UE 110 may transmit the second uplink transmission 512 using the first layer precoder in the second TPMI. The UE 110 may transmit the first uplink transmission 510 and the second uplink transmission 512 with a first reference signal port based on, e.g., the uplink DCI scheduling, such as the DMRS port 0. The first reference signal port may include the configuration information associated with the demodulation reference signals. The UE 110 may configure the first uplink transmission 510 with a second reference signal port, such as the PTRS port 0. The UE may configure the second uplink transmission 512 using a third reference signal port, such as the PTRS 1. The second reference signal port and/or the third reference signal port may include the configuration information associated with the phase tracking reference signals. In one implementation, the first antenna group or antenna panel may be configured with the second reference signal port and the second antenna group or antenna panel may be configured with the third reference signal port.

In an aspect, the UE 110 may transmit a third uplink transmission 520 and a fourth uplink transmission 522, in addition to the first uplink transmission 510 and the second uplink transmission 512, based on the uplink DCI scheduling. The third uplink transmission 520 and the fourth uplink transmission 522 may be multiplexed in the frequency domain. The UE 110 may transmit the third uplink transmission 520 via the first antenna group or antenna panel and the fourth uplink transmission 522 via the second antenna group or antenna panel. The UE 110 may transmit the third uplink transmission 520 based on the first TPMI indicated, e.g., in the DCI. The first TPMI may be associated with digital precoding of the information in the third uplink transmission 520. The UE 110 may transmit the fourth uplink transmission 522 based on the second TPMI indicated, e.g., in the DCI. The second TPMI may be associated with digital precoding of the information in the fourth uplink transmission 522.

In some instances, the third uplink transmission 520 and the fourth uplink transmission 522 may be in a second layer in the uplink DCI scheduling. The UE 110 may transmit the third uplink transmission 520 using a second-layer precoder in the first TPMI. The UE 110 may transmit the fourth uplink transmission 522 using a second-layer precoder in the second TPMI. For example, the uplink DCI may schedule a two-layer transmission for two PUSCH frequency occasions, where a two-layer transmission is in the first PUSCH frequency occasion and a two-layer transmission is in the second PUSCH frequency occasion. Each of the two PUSCH occasions may be indicated by the DCI with a TPMI and a transmit beam (uplink TCI or spatial relation). The first uplink transmission 510 and a third uplink transmission 520 are respectively the first layer and second layer of the two-layer transmission in the first PUSCH frequency occasion based on the first TPMI of two layers. The second uplink transmission 512 and a fourth uplink transmission 522 are respectively the first layer and second layer of the two-layer transmission in the second PUSCH frequency occasion based on the second TPMI of two layers. The UE 110 may transmit the third uplink transmission 520 and the fourth uplink transmission 522 using a fourth reference signal port based on the DCI indication, such as the DMRS port 1. The fourth reference signal port may include the configuration information associated with the demodulation reference signals. The UE 110 may configure the third uplink transmission 520 with the second reference signal port and the fourth uplink transmission 522 with the third reference signal port. The second reference signal port and/or the third reference signal port may include the configuration information associated with the phase tracking reference signals.

In one aspect of the present disclosure, prior to the transmission, the BS 105 may transmit a control indicator (e.g., DCI or TCI) to the UE 110 to signal the association(s) among the first reference signal port, the second reference signal port, the third reference signal port, and/or the fourth reference signal port. In certain implementations, the control indicator may include a TRI indication, a DMRS antenna port indication, and a PTRS-DMRS association indication. The TRI indication may indicate whether a scheduled PUSCH occasion is a one layer or two-layer transmission. The DMRS antenna port indication may indicate which DMRS ports are used for the layers in the scheduled PUSCH occasions. The PTRS-DMRS association indication may indicate which DMRS port in one PUSCH occasion is associated with the PTRS. For example, since there may not be a separate indicator for the precoder of PTRS, the PTRS (when associated with a DMRS port) may be transmitted with the same precoder as the DMRS port in one PUSCH occasion.

In one non-limiting example, the control indicator may include two bits for PTRS-DRMS association indication, which contains a MSB and a LSB. If the TRI indicates a one-layer transmission for each uplink (e.g., PUSCH) frequency occasion, any value of the first bit of the two bits (e.g., MSB) may indicate that the first reference signal port is associated with the second reference signal port for the first uplink (e.g., PUSCH) frequency occasion using the first TMPI. Any value of the second bit of the two bits (e.g., LSB) may indicate that the first reference signal port is associated with the third reference signal port for the second uplink (e.g., PUSCH) frequency occasion using the second TMPI. If the TRI indicates a two-layer transmission for each uplink (e.g., PUSCH) frequency occasion, a first value of the first bit (e.g., MSB=1) may indicate that the first reference signal port is associated with the second reference signal port for the first uplink (e.g., PUSCH) frequency occasion using the first TMPI. A second value of the first bit (e.g., MSB=0) may indicate that the fourth reference signal port is associated with the second reference signal port for the first uplink (e.g., PUSCH) frequency occasion using the first TMPI. A first value of the second bit (e.g., LSB=1) may indicate that the first reference signal port is associated with the third reference signal port for the second uplink (e.g., PUSCH) frequency occasion using the second TMPI. A second value of the second bit (e.g., LSB=0) may indicate that the fourth reference signal port is associated with the third reference signal port for the second uplink (e.g., PUSCH) frequency occasion using the second TMPI.

In some variations, the first uplink transmission 510 and the third uplink transmission 520 may partially or completely overlap in time and frequency. The second uplink transmission 512 and the fourth uplink transmission 422 may partially or completely overlap in time and frequency.

For the codebook based FDM multiple panel transmission 500, one or more PTRS port may be supported.

Figure 6:
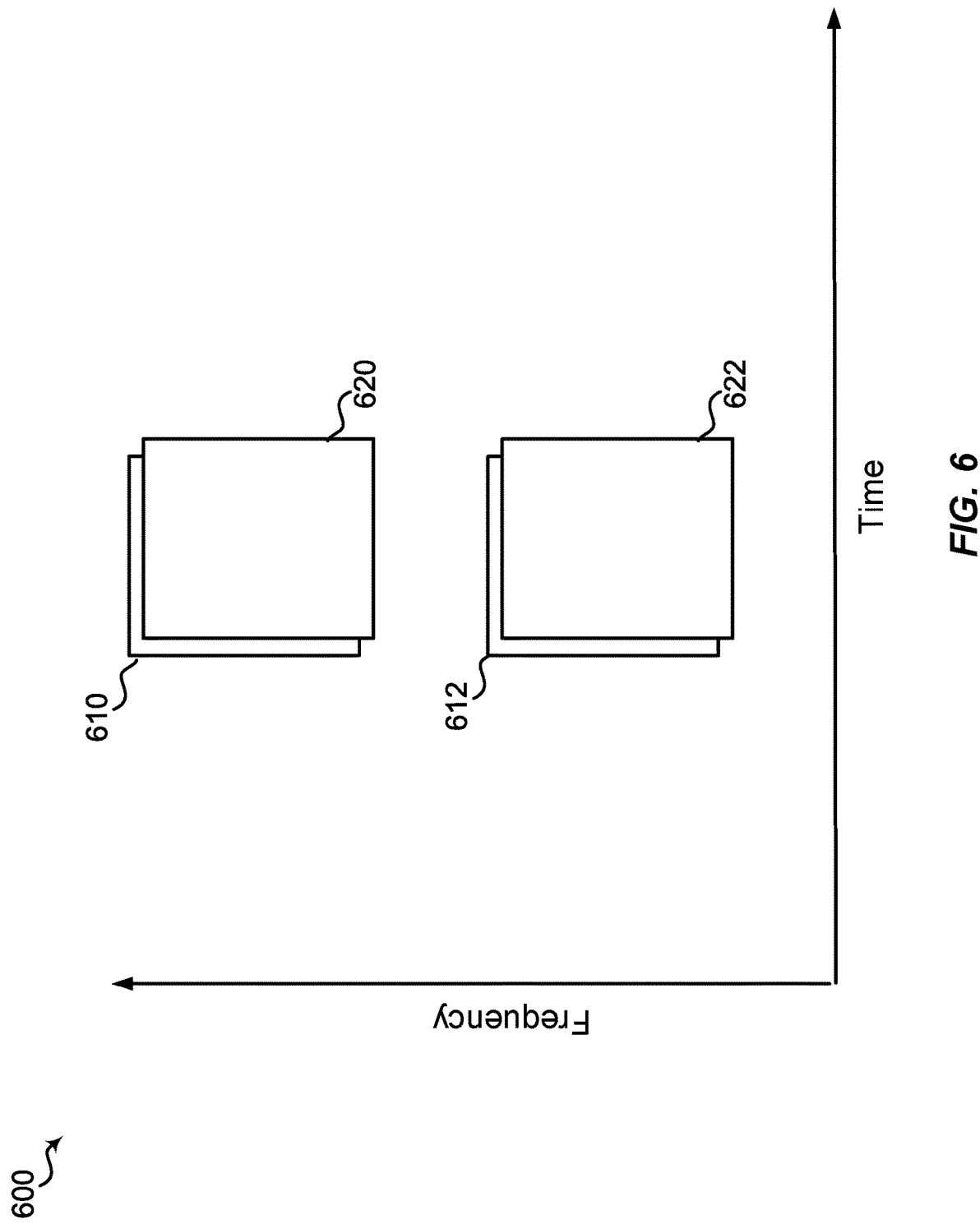
FIG. 6 is a schematic diagram of another example of a codebook based frequency division multiplexing (FDM) multiple panel transmission.

Turning now to FIG. 6, in another example of a codebook based FDM multiple panel transmission 600, two bits may be used to indicate the phase tracking reference signal port association. For example, the two bits may be in the uplink DCI scheduling the same uplink transmissions. In some implementations, the UE 110 may transmit a first uplink transmission 610 and a second uplink transmission 612 based on, e.g., the uplink DCI scheduling. The first uplink transmission 610 and the second uplink transmission 612 may be multiplexed in the frequency domain. The UE 110 may transmit the first uplink transmission 610 via a first antenna group or antenna panel and the second uplink transmission 612 via a second antenna group or antenna panel. The UE 110 may transmit the first uplink transmission 610 based on a first TPMI. The first TPMI may be associated with digital precoding of the information in the first uplink transmission 610. The UE 110 may transmit the second uplink transmission 612 based on a second TPMI indicated in the DCI. The second TPMI may be associated with digital precoding of the information in the second uplink transmission 612 indicated in the DCI.

In some instances, the first uplink transmission 610 and the second uplink transmission 612 may be in a first layer scheduled by the, e.g., uplink DCI. The UE 110 may transmit the first uplink transmission 610 using a first layer precoder in the first TPMI. The UE 110 may transmit the second uplink transmission 612 using the first layer precoder in the second TPMI. The UE 110 may transmit the first uplink transmission 610 and the second uplink transmission 612 using a first reference signal port based on, e.g., the uplink DCI scheduling, such as the DMRS port 0. The first reference signal port may include the configuration information associated with the demodulation reference signals. The UE 110 may configure the first uplink transmission 610 and the second uplink transmission 612 using a second reference signal port based on, e.g., the uplink DCI scheduling, such as the PTRS port 0. The second reference signal port may include the configuration information associated with the phase tracking reference signals. In one implementation, the first antenna group or antenna panel and the second antenna group or antenna panel may be configured with the second reference signal port.

In an aspect, the UE 110 may transmit a third uplink transmission 620 and a fourth uplink transmission 622, in addition to the first uplink transmission 610 and the second uplink transmission 612, based on the uplink DCI scheduling. The third uplink transmission 620 and the fourth uplink transmission 622 may be multiplexed in the frequency domain. The UE 110 may transmit the third uplink transmission 620 via the first antenna group or antenna panel and the fourth uplink transmission 622 via the second antenna group or antenna panel. The UE 110 may transmit the third uplink transmission 620 based on the first TPMI. The first TPMI may be associated with digital precoding of the information in the third uplink transmission 620. The UE 110 may transmit the fourth uplink transmission 622 based on the second TPMI. The second TPMI may be associated with digital precoding of the information in the fourth uplink transmission 622.

In some instances, the third uplink transmission 620 and the fourth uplink transmission 622 may be in a second layer scheduled by, e.g., the uplink DCI. The UE 110 may transmit the third uplink transmission 420 using a second-layer precoder in the first TPMI. The UE 110 may transmit the fourth uplink transmission 622 using a second-layer precoder in the second TPMI. For example, the uplink DCI may schedule a two-layer transmission for two PUSCH time occasions, where a two-layer transmission is in the first PUSCH time occasion and a two-layer transmission is in the second PUSCH time occasion. Each of the two PUSCH occasions may be indicated by the DCI with a TPMI and a transmit beam (uplink TCI or spatial relation). The first uplink transmission 610 and a third uplink transmission 620 are respectively the first layer and second layer of the two-layer transmission in the first PUSCH time occasion based on the first TPMI of two layers. The second uplink transmission 612 and a fourth uplink transmission 622 are respectively the first layer and second layer of the two-layer transmission in the second PUSCH time occasion based on the second TPMI of two layers. The UE 110 may configure transmit the third uplink transmission 620 and the fourth uplink transmission 622 using a third reference signal port based on the DCI indication, such as the DMRS port 1. The fourth reference signal port may include the configuration information associated with the demodulation reference signals. The UE 110 may configure the third uplink transmission 620 and the fourth uplink transmission 622 with the second reference signal port. The second reference signal port may include the configuration information associated with the phase tracking reference signals for both the first and second antenna group or antenna panels.

In one aspect of the present disclosure, prior to the transmission, the BS 105 may transmit a control indicator (e.g., DCI or TCI) to the UE 110 to signal the association(s) among the first reference signal port, the second reference signal port, and/or the third reference signal port. In certain implementations, the control indicator may include a TM indication, a DMRS antenna port indication, and a PTRS-DMRS association indication. The TRI indication may indicate whether a scheduled PUSCH occasion is a one layer or two-layer transmission. The DMRS antenna port indication may indicate which DMRS ports are used for the layers in the scheduled PUSCH occasions. The PTRS-DRMS association indication may indicate which DMRS port in one PUSCH occasion is associated with the PTRS. For example, since there may not be a separate indicator for the precoder of PTRS, the PTRS (when associated with a DMRS port) may be transmitted with the same precoder as the DMRS port in one PUSCH occasion.

In one non-limiting example, the control indicator may include two bits for PTRS-DMRS association indication, which contains a MSB and a LSB. If the TRI indicates a one-layer transmission for each uplink (e.g., PUSCH) frequency occasion, any value of the first bit of the two bits (e.g., MSB) may indicate that the first reference signal port is associated with the second reference signal port for the first uplink (e.g., PUSCH) frequency occasion using the first TMPI. Any value of the second bit of the two bits (e.g., LSB) may indicate that the first reference signal port is associated with the second reference signal port for the second uplink (e.g., PUSCH) frequency occasion using the second TMPI.

If the TRI indicates a two-layer transmission for each uplink (e.g., PUSCH) frequency occasion, a first value of the first bit (e.g., MSB=1) may indicate that the first reference signal port is associated with the second reference signal port for the first uplink (e.g., PUSCH) frequency occasion using the first TMPI. A second value of the first bit (e.g., MSB=0) may indicate that the third reference signal port is associated with the second reference signal port for the first uplink (e.g., PUSCH) frequency occasion using the first TMPI. A first value of the second bit (e.g., LSB=1) may indicate that the first reference signal port is associated with the second reference signal port for the second uplink (e.g., PUSCH) frequency occasion using the second TMPI. A second value of the second bit (e.g., LSB=0) may indicate that the third reference signal port is associated with the second reference signal port for the second uplink (e.g., PUSCH) frequency occasion using the second TMPI.

In some variations, the first uplink transmission 610 and the third uplink transmission 620 may partially or completely overlap in time and frequency. The second uplink transmission 612 and the fourth uplink transmission 422 may partially or completely overlap in time and frequency.

For the codebook based FDM multiple panel transmission 600, one or more PTRS port may be supported.

Figure 7:
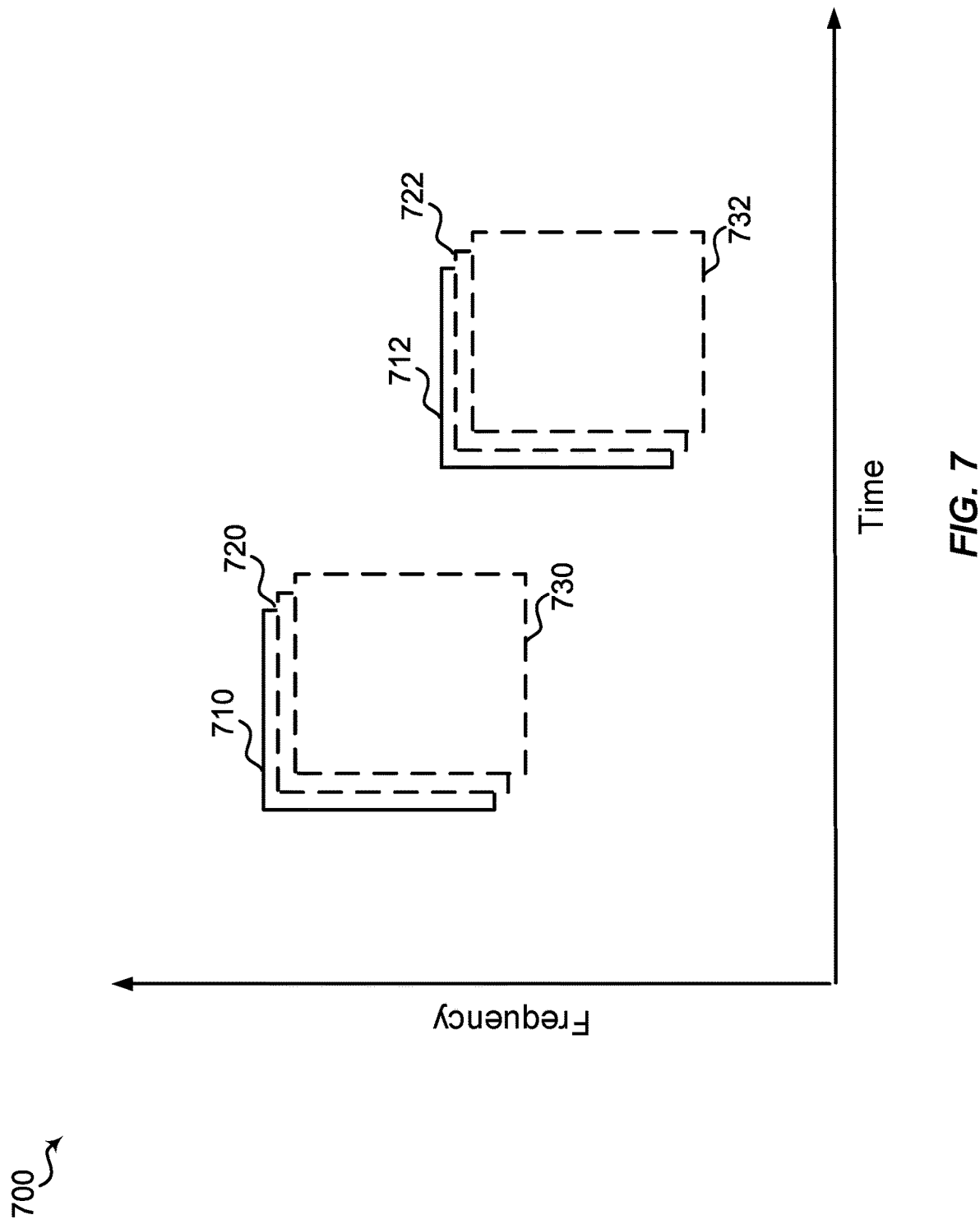
FIG. 7 is a schematic diagram of an example of a codebook based spatial divisional multiplexing (SDM) multiple panel transmission.

Turning to FIG. 7, in an example of a codebook based spatial divisional multiplexing (SDM) multiple panel transmission 700, two bits may be used to indicate the phase tracking reference signal port association. For example, the two bits may be in the uplink DCI scheduling the same uplink transmissions. In some implementations, the UE 110 may transmit some or all of a first uplink transmission 710, a second uplink transmission 712, a third uplink transmission 720, a fourth uplink transmission 722, a fifth uplink transmission 730, and a sixth uplink transmission 732 based on, e.g., the uplink DCI scheduling. The first uplink transmission 710, the second uplink transmission 712, the third uplink transmission 720, the fourth uplink transmission 722 the fifth uplink transmission 730 and the sixth uplink transmission 732 may be multiplexed in the same time and frequency domain, but transmitted with different precoders.

In an implementation, the UE 110 may transmit the first uplink transmission 710 via a first antenna group or antenna panel and the second uplink transmission 712 via a second antenna group or antenna panel. The UE 110 may transmit the first uplink transmission 710 based on a first TPMI indicated in the DCI. The first TPMI may be associated with digital precoding of the information in the first uplink transmission 710. The UE 110 may transmit the second uplink transmission 712 based on a second TPMI indicated in the DCI. The second TPMI may be associated with digital precoding of the information in the second uplink transmission 712.

In some implementations, the UE 110 may transmit one or more of the third uplink transmission 720, fourth uplink transmission 722, fifth uplink transmission 730, and/or the sixth uplink transmission 732, in addition to the first uplink transmission 410 and the second uplink transmission 412, based on the uplink DCI scheduling. For example, the UE 110 may transmit the third uplink transmission 720 via the first antenna group or antenna panel and the fourth uplink transmission 722 via the second antenna group or antenna panel. The UE 110 may transmit the third uplink transmission 720 based on the first TPMI. The UE 110 may transmit the fourth uplink transmission 722 based on the second TPMI. The UE 110 may transmit the fifth uplink transmission 730 via the first antenna group or antenna panel and the sixth uplink transmission 732 via the second antenna group or antenna panel. The UE 110 may transmit the fifth uplink transmission 730 base on the first TPMI. The UE 110 may transmit the sixth uplink transmission 732 based on the second TPMI.

In some instances, the first uplink transmission 710 and the second uplink transmission 712 may be in a first layer of different PUSCH spatial occasions scheduled by the uplink DCI scheduling. The third uplink transmission 720 and the fourth uplink transmission 722 may be in a second layer of different PUSCH spatial occasions scheduled by the uplink DCI scheduling. The fifth uplink transmission 730 and the sixth uplink transmission 732 may be in a third layer of different PUSCH spatial occasions scheduled by the uplink DCI scheduling.

For the codebook based SDM multiple panel transmission 700, one or more PTRS port may be supported.

In a first example, the UE 110 may transmit the first uplink transmission 710 and the second uplink transmission 712. The UE 110 may transmit the first uplink transmission 710 using a first reference signal port of the first uplink (e.g., PUSCH) spatial occasion (such as the DMRS port 0), and the second uplink transmission 712 using a first reference signal port of the second uplink (e.g., PUSCH) spatial occasion (such as the DMRS port 4) based on, e.g., the uplink DCI scheduling. The first reference signal port may include the configuration information associated with the demodulation reference signals. The UE 110 may configure the first uplink transmission 710 with a second reference signal port, such as the PTRS port 0. The UE 110 may configure the second uplink transmission 712 with a third reference signal port, such as the PTRS port 1. The second reference signal port and/or the third reference signal port may include the configuration information associated with the phase tracking reference signals. In one implementation, the first antenna group or antenna panel may be configured with the second reference signal port and the second antenna group or antenna panel may be configured with the third reference signal port.

In one aspect of the present disclosure, prior to the transmission, the BS 105 may transmit a control indicator (e.g., DCI or TCI) to the UE 110 to signal the association(s) among the first reference signal port, the second reference signal port, and/or the third reference signal port. The control indicator may include two bits for PTRS-DMRS association indication, which contains a MSB and a LSB. In the first example, the uplink DCI may schedule a one-layer transmission for two uplink (e.g., PUSCH) spatial occasions, where a one-layer transmission is in the first uplink (e.g., PUSCH) spatial occasion and another one-layer transmission is in the second uplink (e.g., PUSCH) spatial occasion. Each of the two uplink (e.g., PUSCH) occasions may be indicated by the DCI with a TPMI and a transmit beam (uplink TCI or spatial relation). The first uplink transmission 710 is the one-layer transmission in the first uplink (e.g., PUSCH) spatial occasion based on the first TPMI of one layer and a second uplink transmission 712 is the one-layer transmission in the second uplink (e.g., PUSCH) spatial occasion based on the second TPMI of one layer. Any values of the first bit of the two bits may indicate that the first reference signal port of the first uplink (e.g., PUSCH) spatial occasion is associated with the second reference signal port for the first uplink (e.g., PUSCH) spatial occasion using the first TMPI. Any values of the second bit of the two bits may indicate that the first reference signal port of the second uplink (e.g., PUSCH) spatial occasion is associated with the second reference signal port for the second uplink (e.g., PUSCH) spatial occasion using the second TMPI.

In a second example, the UE 110 may transmit the first uplink transmission 710, the second uplink transmission 712, and the fourth uplink transmission 722. The uplink DCI may schedule a one-layer transmission as the first uplink transmission 710 for the first uplink (e.g., PUSCH) spatial occasion using the first TPMI of one layer, and another two-layer transmission as the second uplink transmission 712 and the fourth uplink transmission 722 in the second uplink (e.g., PUSCH) spatial occasion using the second TPMI of two layers. Thus, the first uplink transmission 710 and the second uplink transmission 712 may be in a first layer of each uplink (e.g., PUSCH) spatial occasion. The fourth uplink transmission 722 may be in a second layer of the second uplink (e.g., PUSCH) spatial occasion. The UE 110 may be indicated by the uplink DCI to transmit the first uplink transmission 710 using a first reference signal port of the first uplink (e.g., PUSCH) spatial occasion (such as the DMRS port 0), the second uplink transmission 712 using a first reference signal port of the second uplink (e.g., PUSCH) spatial occasion (such as the DMRS port 4), second uplink transmission 712 using a second reference signal port of the second uplink (e.g., PUSCH) spatial occasion (such as the DMRS port 5). The first reference signal ports and/or the second reference signal port for two uplink (e.g., PUSCH) spatial occasions may include the configuration information associated with the demodulation reference signals. The UE 110 may configure the first uplink transmission 710 with a third reference signal port, such as the PTRS port 0. The UE 110 may configure the second uplink transmission 712 and the fourth uplink transmission 722 with a fourth reference signal port, such as the PTRS port 1. The third reference signal port and/or the fourth reference signal port may include the configuration information associated with the phase tracking reference signals. In one implementation, the first antenna may be configured with the third reference signal port and the second antenna may be configured with the fourth reference signal port.

In one aspect of the present disclosure, prior to the transmission, the BS 105 may transmit a control indicator (e.g., DCI or TCI) to the UE 110 to signal the association(s) among the first reference signal port, the second reference signal port, the third reference signal port and/or the fourth reference signal port. The control indicator may include two bits for PTRS-DMRS association indication, which includes a MSB and a LSB. Any values of first bit of the two bits (e.g., MSB) may indicate that the first reference signal port of the first uplink (e.g., PUSCH) spatial occasion is associated with the third reference signal port for the first uplink (e.g., PUSCH) spatial occasion using the first TMPI. The first value of the second bit of the two bits (e.g., LSB=1) may indicate that the first reference signal port of the second uplink (e.g., PUSCH) spatial occasion is associated with the fourth reference signal port for the second uplink (e.g., PUSCH) spatial occasion using the second TMPI. The second value of the second bit of the two bits (e.g., LSB=0) may indicate that the second reference signal port of the second uplink (e.g., PUSCH) spatial occasion is associated with the fourth reference signal port for the second uplink (e.g., PUSCH) spatial occasion using second TMPI.

In a third example, the UE 110 may transmit the first uplink transmission 710, the second uplink transmission 712, and the third uplink transmission 720. The uplink DCI may schedule a two-layer transmission as the first uplink transmission 710 and the third uplink transmission 720 for the first uplink (e.g., PUSCH) spatial occasion using the first TPMI of two layer, and another one-layer transmission as the second uplink transmission 712 in the second uplink (e.g., PUSCH) spatial occasion using the second TPMI of one layer. The UE 110 may be indicated by the uplink DCI to transmit the first uplink transmission 710 using a first reference signal port of the first uplink (e.g., PUSCH) spatial occasion (such as the DMRS port 0), the second uplink transmission 712 using a first reference signal port of the second uplink (e.g., PUSCH) spatial occasion (such as the DMRS port 4), the third uplink transmission 720 using a second reference signal port of the first uplink (e.g., PUSCH) spatial occasion (such as the DMRS port 1). The first reference signal port(s) and/or the second reference signal port may include the configuration information associated with the demodulation reference signals. The UE 110 may configure the first uplink transmission 710 and the third uplink transmission 720 using a third reference signal port, such as the PTRS port 0. The UE 110 may configure the second uplink transmission 712 using a fourth reference signal port, such as the PTRS port 1. The third reference signal port and/or the fourth reference signal port may include the configuration information associated with the phase tracking reference signals. In one implementation, the first antenna group or antenna panel may be configured with the third reference signal port and the second antenna group or antenna panel may be configured with the fourth reference signal port.

In one aspect of the present disclosure, prior to the transmission, the BS 105 may transmit a control indicator (e.g., DCI or TCI) to the UE 110 to signal the association(s) among the first reference signal port, the second reference signal port, the third reference signal port, and/or the fourth reference signal port. The control indicator may include two bits for PTRS-DMRS association, which contains a MSB and a LSB. The first value of the first bit of the two bits (e.g., MSB=1) may indicate that the first reference signal port of the first uplink (e.g., PUSCH) spatial occasion is associated with the third reference signal port for the first uplink (e.g., PUSCH) spatial occasion using the first TMPI. The second value of the first bit of the two bits (e.g., MSB=0) may indicate that the second reference signal port of the first uplink (e.g., PUSCH) spatial occasion is associated with the third reference signal port for the first uplink (e.g., PUSCH) spatial occasion using the first TMPI. Any value of the second bit of two bits (LSB=either 1 or 0) may indicate that the first reference signal port of the second uplink (e.g., PUSCH) spatial occasion is associated with the fourth reference signal port for the second uplink (e.g., PUSCH) spatial occasion using the second TMPI.

In a fourth example, the UE 110 may transmit the first uplink transmission 710, the second uplink transmission 712, the third uplink transmission 720, and the fourth uplink transmission 722. The uplink DCI may schedule a two-layer transmission as the first uplink transmission 710 and the third uplink transmission 720 for the first uplink (e.g., PUSCH) spatial occasion using the first TPMI of two layer, and another two-layer transmission as the second uplink transmission 712 and the fourth uplink transmission 722 in the second uplink (e.g., PUSCH) spatial occasion using the second TPMI of two layer. The UE 110 may be indicated by the uplink DCI to transmit the first uplink transmission 710 using a first reference signal port of the first uplink (e.g., PUSCH) spatial occasion (such as the DMRS port 0), the second uplink transmission 712 using a first reference signal port of the second uplink (e.g., PUSCH) spatial occasion (such as the DMRS port 4), the third uplink transmission 720 using a second reference signal port of the first uplink (e.g., PUSCH) spatial occasion (such as the DMRS port 1), and the fourth uplink transmission 722 using a second reference signal port of the second uplink (e.g., PUSCH) spatial occasion (such as the DMRS port 5). The first reference signal ports and/or the second reference signal ports may include the configuration information associated with the demodulation reference signals. The UE 110 may configure the first uplink transmission 710 and the third uplink transmission 720 using a third reference signal port, such as the PTRS port 0. The UE 110 may configure the second uplink transmission 712 and the fourth uplink transmission 722 using a fourth reference signal port, such as the PTRS port 1. The third reference signal port and/or the fourth reference signal port may include the configuration information associated with the phase tracking reference signals. In one implementation, the first antenna group or antenna panel may be configured with the third reference signal port and the second antenna group or antenna panel may be configured with the fourth reference signal port.

In one aspect of the present disclosure, prior to the transmission, the BS 105 may transmit a control indicator (e.g., DCI or TCI) to the UE 110 to signal the association(s) among the first reference signal port, the second reference signal port, the third reference signal port, and/or the fourth reference signal port. The control indicator may include two bits for PTRS-DMRS association indication with a MSB and a LSB. The first value of the first bit of the two bits (e.g., MSB=1) may indicate that the first reference signal port of the first uplink (e.g., PUSCH) spatial occasion is associated with the third reference signal port for the first uplink (e.g., PUSCH) spatial occasion using the first TMPI. The second value of the first bit of the two bits (e.g., MSB=0) may indicate that the second reference signal port of the first uplink (e.g., PUSCH) spatial occasion is associated with the third reference signal port for the first uplink (e.g., PUSCH) spatial occasion using the first TMPI. The first value of the second bit of the two bits (e.g., LSB=1) may indicate that the first reference signal port of the second uplink (e.g., PUSCH) spatial occasion with the fourth reference signal port for the second uplink (e.g., PUSCH) spatial occasion using the second TMPI. The second value of the second bit of the two bits (e.g., LSB=0) may indicate that the second reference signal port of the second uplink (e.g., PUSCH) spatial occasion is associated with the fourth reference signal port for the second uplink (e.g., PUSCH) spatial occasion using the second TMPI.

In a fifth example, the UE 110 may transmit the first uplink transmission 710, the second uplink transmission 712, the fourth uplink transmission 722, and the sixth uplink transmission 732. The uplink DCI may schedule a one-layer transmission as the first uplink transmission 710 for the first uplink (e.g., PUSCH) spatial occasion using the first TPMI of one layer, and another three-layer transmission as the second uplink transmission 712, the fourth uplink transmission 722 and the sixth uplink transmission 732 in the second uplink (e.g., PUSCH) spatial occasion using the second TPMI of three layer. The UE 110 may be indicated by the uplink DCI to transmit the first uplink transmission 710 using a first reference signal port of the first uplink (e.g., PUSCH) spatial occasion (such as the DMRS port 0), the second uplink transmission 712 using a first reference signal port of the second uplink (e.g., PUSCH) spatial occasion (such as the DMRS port 4), the fourth uplink transmission 722 using a second reference signal port of the second uplink (e.g., PUSCH) spatial occasion (such as the DMRS port 5), and the sixth uplink transmission 732 using a third reference signal port of the second uplink (e.g., PUSCH) spatial occasion (such as the DMRS port 6). The first reference signal ports, the second reference signal port, and/or the third reference signal port may include the configuration information associated with the demodulation reference signals. The UE 110 may configure the first uplink transmission 710 using a fourth reference signal port, such as the PTRS port 0. The UE 110 may configure the second uplink transmission 712, the fourth uplink transmission 722, and the sixth uplink transmission 732 using a fifth reference signal port, such as the PTRS port 1. The fourth reference signal port and/or the fifth reference signal port may include the configuration information associated with the phase tracking reference signals. In one implementation, the first antenna group or antenna panel may be configured with the fourth reference signal port and the second antenna group or antenna panel may be configured with the fifth reference signal port.

In one aspect of the present disclosure, prior to the transmission, the BS 105 may transmit a control indicator (e.g., DCI or TCI) to the UE 110 to signal the association(s) among the first reference signal port, the second reference signal port, the third reference signal port, the fourth reference signal port, and/or the fifth reference signal port. The control indicator may include two bits for PTRS-DMRS association indication with a MSB and a LSB. Any value of the two bits may indicate that the first reference signal port of the first uplink (e.g., PUSCH) spatial occasion is associated with the fourth reference signal port for the first uplink (e.g., PUSCH) spatial occasion using the first TMPI. The first value (e.g., "10") of the two bits may indicate that the first reference signal port of the second uplink (e.g., PUSCH) spatial occasion is associated with the fifth reference signal port for the second uplink (e.g., PUSCH) spatial occasion using the second TMPI. The second value (e.g., "01") of the two bits may indicate that the second reference signal port of the second uplink (e.g., PUSCH) spatial occasion is associated with the fifth reference signal port for the second uplink (e.g., PUSCH) spatial occasion using the second TMPI. The third value (e.g., "00") of the two bits may indicate that the third reference signal port of the second uplink (e.g., PUSCH) spatial occasion is associated with the fifth reference signal port for the second uplink (e.g., PUSCH) spatial occasion using the second TMPI.

In a sixth example, the UE 110 may transmit the first uplink transmission 710, the second uplink transmission 712, the third uplink transmission 720, and the fifth uplink transmission 730. The uplink DCI may schedule a three-layer transmission as the first uplink transmission 710, the third uplink transmission 720, and the fifth uplink transmission 730 for the first uplink (e.g., PUSCH) spatial occasion using the first TPMI of three layer, and another one-layer transmission as the second uplink transmission 712 in the second uplink (e.g., PUSCH) spatial occasion using the second TPMI of one layer. The UE 110 may be indicated by the uplink DCI to transmit the first uplink transmission 710 using a first reference signal port of the first uplink (e.g., PUSCH) spatial occasion (such as the DMRS port 0), the third uplink transmission 720 using a second reference signal port of the first uplink (e.g., PUSCH) spatial occasion (such as the DMRS port 1), the fifth uplink transmission 730 using a third reference signal port of the first uplink (e.g., PUSCH) spatial occasion (such as the DMRS port 2), and the second uplink transmission 712 using a first reference signal port of the second uplink (e.g., PUSCH) spatial occasion (such as the DMRS port 4). The first reference signal ports, the second reference signal port, and/or the third reference signal port may include the configuration information associated with the demodulation reference signals. The UE 110 may configure the first uplink transmission 710, the third uplink transmission 720, and the fifth uplink transmission 730 using a fourth reference signal port, such as the PTRS port 0. The UE 110 may configure the second uplink transmission 712 using a fifth reference signal port, such as the PTRS port 1. The fourth reference signal port and/or the fifth reference signal port may include the configuration information associated with the phase tracking reference signals. In one implementation, the first antenna group or antenna panel may be configured with the fourth reference signal port and the second antenna group or antenna panel may be configured with the fifth reference signal port.

In one aspect of the present disclosure, prior to the transmission, the BS 105 may transmit a control indicator (e.g., DCI or TCI) to the UE 110 to signal the association(s) among the first reference signal port, the second reference signal port, the third reference signal port, the fourth reference signal port, and/or the fifth reference signal port. The control indicator may include two bits for PTRS-DMRS association indication. The first value (e.g., "11") of the two bits may indicate that the first reference signal port of the first uplink (e.g., PUSCH) spatial occasion is associated with the fourth reference signal port for the first uplink (e.g., PUSCH) spatial occasion using the first TMPI. The values of "10" of the two bits may indicate that the second reference signal port of the first uplink (e.g., PUSCH) spatial occasion is associated with the fourth reference signal port for the first uplink (e.g., PUSCH) spatial occasion using the first TMPI. The value of "01" of the two bits may indicate that the third reference signal port of the first uplink (e.g., PUSCH) spatial occasion is associated with the fourth reference signal port for the first uplink (e.g., PUSCH) spatial occasion using the first TMPI. Any value of the two bits may indicate that the first reference signal port of the second uplink (e.g., PUSCH) spatial occasion is associated with the fifth reference signal port for the second uplink (e.g., PUSCH) spatial occasion using the second TMPI.

Turning to FIG. 8, in certain implementations, in an example of a non-codebook based TDM multiple panel transmission 800, the UE 110 may support at least one PTRS port in radio resource control (RRC) configuration, where a PTRS port in different times is associated with different uplink transmissions, such as uplink transmissions 810, 812.

Still referring to FIG. 8, in some instances, in an example of a non-codebook based FDM multiple panel transmission 802, the UE 110 may support at least one PTRS port in radio resource control (RRC) configuration, where a PTRS port in different frequencies is associated with different uplink transmissions, such as uplink transmissions 820, 822. In another implementation, two PTRS ports in different frequencies may be associated with different uplink transmissions, such as the uplink transmissions 820, 822.

Still referring to FIG. 8, in some instances, in an example of a non-codebook based SDM multiple panel transmission 804, the UE 110 may support at least one PTRS port in radio resource control (RRC) configuration, where two PTRS ports in different frequencies and/or time may be associated with different uplink transmissions, such as the uplink transmissions 830, 832.

Referring to FIG. 9, an example of a method 900 for associating reference signals may be performed by the UE 110 in the wireless communication network 100.

At block 905, the method 900 may receive an indicator for uplink transmission indicating at least an association between at least one of one or more first reference signal ports and at least one of one or more second reference signal ports for a plurality of precoding configurations. For example, the communication component 222, the modem 220, and/or the processor 212 of the UE 110 may receive an indicator for uplink transmission indicating at least an association between at least one of one or more first reference signal ports and at least one of one or more second reference signal ports for a plurality of precoding configurations, such as described above with regard to FIGS. 4-7. Examples of the uplink transmission includes physical uplink shared channel (PUSCH), physical uplink control channel (PUCCH), etc. In some implementations, the indicator may include one or more of a DCI, TCI, a schedule request indicator (SRI), RRC configuration, sounding reference signal (SRS) set, etc. The one or more antennas 265 may receive electro-magnetic signals from one or more antennas 265 of the UE 110. The RF front end 288 may filter, amplify, and/or extract electrical signals carried by the electro-magnetic signals. The transceiver 202 or the receiver 206 may digitize and convert the electrical signal into the data, such as the indicator, and send to the communication component 222.

In certain implementations, the processor 212, the modem 220, the communication component 222, the transceiver 202, the receiver 206, the transmitter 208, the RF front end 288, and/or the subcomponents of the RF front end 288 may be configured to and/or may define means for receiving an indicator for uplink transmission indicating at least an association between at least one of one or more first reference signal ports and at least one of one or more second reference signal ports for a plurality of precoding configurations.

At block 910, the method 900 may transmit, in response to receiving the indicator, a plurality of first reference signals based on the association via a plurality of antenna panels using the plurality of precoding configurations, wherein the plurality of first reference signals is associated with the one or more first reference signal ports. For example, the communication component 222, the modem 220, and/or the processor 212 of the UE 110 may transmit, in response to receiving the indicator, the DMRS to the BS 105. The DMRS may be configured according to the DMRS ports. The communication component 222 may send the DMRS to the transceiver 202 or the transmitter 208. The transceiver 202 or the transmitter 208 may convert the DMRS to electrical signals and send to the RF front end 288. The RF front end 288 may filter and/or amplify the electrical signals. The RF front end 288 may send the electrical signals as electro-magnetic signals via the one or more antennas 265.

In certain implementations, the processor 212, the modem 220, the communication component 222, the transceiver 202, the receiver 206, the transmitter 208, the RF front end 288, and/or the subcomponents of the RF front end 288 may be configured to and/or may define means for transmitting, in response to receiving the indicator, a plurality of first reference signals based on the association via a plurality of antenna panels using the plurality of precoding configurations, wherein the plurality of first reference signals is associated with the one or more first reference signal ports.

At block 915, the method 900 may transmit one or more second reference signals based on the association via the plurality of antenna panels using the plurality of precoding configurations, wherein the one or more second reference signals is associated with the one or more second reference signal ports. For example, the communication component 222, the modem 220, and/or the processor 212 of the UE 110 may transmit the PTRS to the BS 105. The PTRS may be configured according to the PTRS ports. The communication component 222 may send the PTRS to the transceiver 202 or the transmitter 208. The transceiver 202 or the transmitter 208 may convert the PTRS to electrical signals and send to the RF front end 288. The RF front end 288 may filter and/or amplify the electrical signals. The RF front end 288 may send the electrical signals as electro-magnetic signals via the one or more antennas 265.

In certain implementations, the processor 212, the modem 220, the communication component 222, the transceiver 202, the receiver 206, the transmitter 208, the RF front end 288, and/or the subcomponents of the RF front end 288 may be configured to and/or may define means for transmitting one or more second reference signals based on the association via the plurality of antenna panels using the plurality of precoding configurations, wherein the one or more second reference signals is associated with the one or more second reference signal ports.

Alternatively or additionally, the method 900 may further include any of the methods above, wherein receiving the indicator further comprises receiving a first bit comprising a first bit value indicating whether a first port of the one or more first reference signal ports is associated with a first port of the one or more second reference signal ports for a first precoding configuration of the plurality of precoding configurations for a first layer of the uplink transmission and a second bit comprising a second bit value indicating whether the first port of the one or more first reference signal ports is associated with the first port of the one or more second reference signal ports for a second precoding configuration of the plurality of precoding configurations for the first layer of the uplink transmission.

Alternatively or additionally, the method 900 may further include any of the methods above, wherein a first value of the first bit indicates that the first port of the one or more first reference signal ports is associated with the first port of the one or more second reference signal ports for the first precoding configuration of the plurality of precoding configurations for a second layer of the uplink transmission, a second value of the first bit indicates that a second port of the one or more first reference signal ports is associated with the first port of the one or more second reference signal ports for the first precoding configuration of the plurality of precoding configurations for the second layer of the uplink transmission, a first value of the second bit indicates that the first port of the one or more first reference signal ports is associated with the first port of the one or more second reference signal ports for the second precoding configuration of the plurality of precoding configurations for a second layer of the uplink transmission, and a second value of the second bit indicates that the second port of the one or more first reference signal ports is associated with the first port of the one or more second reference signal ports for the second precoding configuration of the plurality of precoding configurations for the second layer of the uplink transmission.

Alternatively or additionally, the method 900 may further include any of the methods above, wherein the uplink transmission utilizes time division multiplexing.

Alternatively or additionally, the method 900 may further include any of the methods above, wherein receiving the indicator further comprises receiving a first bit comprising a first bit value indicating whether a first port of the one or more first reference signal ports is associated with a first port of the one or more second reference signal ports for a first precoding configuration of the plurality of precoding configurations for a first layer of the uplink transmission and a second bit comprising a second bit value indicating whether the first port of the one or more first reference signal ports is associated with a second port of the one or more second reference signal ports for a second precoding configuration of the plurality of precoding configurations for the first layer of the uplink transmission.

Alternatively or additionally, the method 900 may further include any of the methods above, wherein a first value of the first bit indicates that the first port of the one or more first reference signal ports is associated with the first port of the one or more second reference signal ports for the first precoding configuration of the plurality of precoding configurations for a second layer of the uplink transmission, a second value of the first bit indicates that a second port of the one or more first reference signal ports is associated with the first port of the one or more second reference signal ports for the first precoding configuration of the plurality of precoding configurations for the second layer of the uplink transmission, a first value of the second bit indicates that the first port of the one or more first reference signal ports is associated with a second port of the one or more second reference signal ports for the second precoding configuration of the plurality of precoding configurations for a second layer of the uplink transmission, a second value of the second bit indicates that the second port of the one or more first reference signal ports is associated with the second port of the one or more second reference signal ports for the second precoding configuration of the plurality of precoding configurations for the second layer of the uplink transmission.

Alternatively or additionally, the method 900 may further include any of the methods above, wherein the uplink transmission utilizes frequency division multiplexing.

Alternatively or additionally, the method 900 may further include any of the methods above, wherein a first value of the first bit indicates that the first port of the one or more first reference signal ports is associated with the first port of the one or more second reference signal ports for the first precoding configuration of the plurality of precoding configurations for a second layer of the uplink transmission, a second value of the first bit indicates that a second port of the one or more first reference signal ports is associated with the first port of the one or more second reference signal ports for the first precoding configuration of the plurality of precoding configurations for the second layer of the uplink transmission, a first value of the second bit indicates that the first port of the one or more first reference signal ports is associated with a second port of the one or more second reference signal ports for the second precoding configuration of the plurality of precoding configurations for a second layer of the uplink transmission, and a second value of the second bit indicates that the second port of the one or more first reference signal ports is associated with the second port of the one or more second reference signal ports for the second precoding configuration of the plurality of precoding configurations for the second layer of the uplink transmission.

Alternatively or additionally, the method 900 may further include any of the methods above, wherein the uplink transmission utilizes frequency division multiplexing.

Referring to FIG. 10, an example of a method 1000 for associating reference signals may be performed by the BS 105 in the wireless communication network 100.

At block 1005, the method 1000 may transmit an indicator for uplink transmission indicating at least an association between at least one of one or more first reference signal ports and at least one of one or more second reference signal ports for a plurality of precoding configurations. For example, the communication component 322, the modem 320, and/or the processor 312 of the BS 105 may transmit an indicator for uplink transmission indicating at least an association between at least one of one or more first reference signal ports and at least one of one or more second reference signal ports for a plurality of precoding configurations, such as described above with regard to FIGS. 4-7. The communication component 322 may send the indicator to the transceiver 302 or the transmitter 308. The transceiver 302 or the transmitter 308 may convert the indicator to electrical signals and send to the RF front end 388. The RF front end 388 may filter and/or amplify the electrical signals. The RF front end 388 may send the electrical signals as electro-magnetic signals via the one or more antennas 365.

In certain implementations, the processor 312, the modem 320, the communication component 322, the transceiver 302, the receiver 306, the transmitter 308, the RF front end 388, and/or the subcomponents of the RF front end 388 may be configured to and/or may define means for transmitting an indicator for uplink transmission indicating at least an association between at least one of one or more first reference signal ports and at least one of one or more second reference signal ports for a plurality of precoding configurations.

At block 1010, the method 1000 may receive, in response to transmitting the indicator, a plurality of first reference signals based on the association via a plurality of antenna panels using the plurality of precoding configurations, wherein the plurality of first reference signals is associated with the one or more first reference signal ports. For example, the communication component 322, the modem 320, and/or the processor 312 of the BS 105 may receive the DMRS. The one or more antennas 365 may receive electro-magnetic signals from one or more antennas 365 of the BS 105. The RF front end 388 may filter, amplify, and/or extract electrical signals carried by the electro-magnetic signals. The transceiver 302 or the receiver 306 may digitize and convert the electrical signal into the data, such as the DMRS, and send to the communication component 322.

In certain implementations, the processor 312, the modem 320, the communication component 322, the transceiver 302, the receiver 306, the transmitter 308, the RF front end 388, and/or the subcomponents of the RF front end 388 may be configured to and/or may define means for receiving, in response to transmitting the indicator, a plurality of first reference signals based on the association via a plurality of antenna panels using the plurality of precoding configurations, wherein the plurality of first reference signals is associated with the one or more first reference signal ports.

At block 1015, the method 1000 may receive one or more second reference signals based on the association via the plurality of antenna panels using the plurality of precoding configurations, wherein the one or more second reference signals is associated with the one or more second reference signal ports. For example, the communication component 322, the modem 320, and/or the processor 312 of the BS 105 may receive the PTRS. The one or more antennas 365 may receive electro-magnetic signals from one or more antennas 365 of the BS 105. The RF front end 388 may filter, amplify, and/or extract electrical signals carried by the electro-magnetic signals. The transceiver 302 or the receiver 306 may digitize and convert the electrical signal into the data, such as the PTRS, and send to the communication component 322.

In certain implementations, the processor 312, the modem 320, the communication component 322, the transceiver 302, the receiver 306, the transmitter 308, the RF front end 388, and/or the subcomponents of the RF front end 388 may be configured to and/or may define means for receiving one or more second reference signals based on the association via the plurality of antenna panels using the plurality of precoding configurations, wherein the one or more second reference signals is associated with the one or more second reference signal ports.

Alternatively or additionally, the method 1000 may further include any of the methods above, wherein transmitting the indicator further comprises transmitting a first bit indicating whether a first port of the one or more first reference signal ports is associated with a first port of the one or more second reference signal ports for a first precoding configuration of the plurality of precoding configurations for a first layer of the uplink transmission and a second bit comprising a second bit value indicating whether the first port of the one or more first reference signal ports is associated with the first port of the one or more second reference signal ports for a second precoding configuration of the plurality of precoding configurations for the first layer of the uplink transmission.

Alternatively or additionally, the method 1000 may further include any of the methods above, wherein a first value of the first bit indicates that the first port of the one or more first reference signal ports is associated with the first port of the one or more second reference signal ports for the first precoding configuration of the plurality of precoding configurations for a second layer of the uplink transmission, a second value of the first bit indicates that a second port of the one or more first reference signal ports is associated with the first port of the one or more second reference signal ports for the first precoding configuration of the plurality of precoding configurations for the second layer of the uplink transmission, a first value of the second bit indicates that the first port of the one or more first reference signal ports is associated with the first port of the one or more second reference signal ports for the second precoding configuration of the plurality of precoding configurations for a second layer of the uplink transmission, and a second value of the second bit indicates that the second port of the one or more first reference signal ports is associated with the first port of the one or more second reference signal ports for the second precoding configuration of the plurality of precoding configurations for the second layer of the uplink transmission.

Alternatively or additionally, the method 1000 may further include any of the methods above, wherein the uplink transmission utilizes time division multiplexing.

Alternatively or additionally, the method 1000 may further include any of the methods above, wherein transmitting the indicator further comprises transmitting a first bit indicating whether a first port of the one or more first reference signal ports is associated with a first port of the one or more second reference signal ports for a first precoding configuration of the plurality of precoding configurations for a first layer of the uplink transmission and a second bit comprising a second bit value indicating whether the first port of the one or more first reference signal ports is associated with a second port of the one or more second reference signal ports for a second precoding configuration of the plurality of precoding configurations for the first layer of the uplink transmission.

Alternatively or additionally, the method 1000 may further include any of the methods above, wherein a first value of the first bit indicates that the first port of the one or more first reference signal ports is associated with the first port of the one or more second reference signal ports for the first precoding configuration of the plurality of precoding configurations for a second layer of the uplink transmission, a second value of the first bit indicates that a second port of the one or more first reference signal ports is associated with the first port of the one or more second reference signal ports for the first precoding configuration of the plurality of precoding configurations for the second layer of the uplink transmission, a first value of the second bit indicates that the first port of the one or more first reference signal ports is associated with a second port of the one or more second reference signal ports for the second precoding configuration of the plurality of precoding configurations for a second layer of the uplink transmission, a second value of the second bit indicates that the second port of the one or more first reference signal ports is associated with the second port of the one or more second reference signal ports for the second precoding configuration of the plurality of precoding configurations for the second layer of the uplink transmission.

Alternatively or additionally, the method 1000 may further include any of the methods above, wherein the uplink transmission utilizes frequency division multiplexing.

Alternatively or additionally, the method 1000 may further include any of the methods above, wherein a first value of the first bit indicates that the first port of the one or more first reference signal ports is associated with the first port of the one or more second reference signal ports for the first precoding configuration of the plurality of precoding configurations for a second layer of the uplink transmission, a second value of the first bit indicates that a second port of the one or more first reference signal ports is associated with the first port of the one or more second reference signal ports for the first precoding configuration of the plurality of precoding configurations for the second layer of the uplink transmission, a first value of the second bit indicates that the first port of the one or more first reference signal ports is associated with a second port of the one or more second reference signal ports for the second precoding configuration of the plurality of precoding configurations for a second layer of the uplink transmission, and a second value of the second bit indicates that the second port of the one or more first reference signal ports is associated with the second port of the one or more second reference signal ports for the second precoding configuration of the plurality of precoding configurations for the second layer of the uplink transmission.

Alternatively or additionally, the method 1000 may further include any of the methods above, wherein the uplink transmission utilizes frequency division multiplexing.

Referring to FIG. 11, an example of a method 1100 for associating reference signals may be performed by the UE 110 in the wireless communication network 100.

At block 1105, the method 1100 may receive an indicator for a plurality of uplink transmissions indicating at least an association between at least one of one or more reference signal ports and the plurality of uplink transmissions. For example, the communication component 222, the modem 220, and/or the processor 212 of the UE 110 may receive an indicator for a plurality of uplink transmissions indicating at least an association between at least one of one or more reference signal ports and the plurality of uplink transmissions, such as described above with regard to FIG. 8. Examples of the uplink transmission includes PUSCH, PUCCH, etc. In some implementations, the indicator may include one or more of a DCI, TCI, SRI, RRC configuration, SRS set, etc. The one or more antennas 265 may receive electro-magnetic signals from one or more antennas 265 of the UE 110. The RF front end 288 may filter, amplify, and/or extract electrical signals carried by the electro-magnetic signals. The transceiver 202 or the receiver 206 may digitize and convert the electrical signal into the data, such as the indicator, and send to the communication component 222.

In certain implementations, the processor 212, the modem 220, the communication component 222, the transceiver 202, the receiver 206, the transmitter 208, the RF front end 288, and/or the subcomponents of the RF front end 288 may be configured to and/or may define means for receiving an indicator for a plurality of uplink transmissions indicating at least an association between at least one of one or more reference signal ports and the plurality of uplink transmissions.

At block 1110, the method 1100 may transmit, in response to receiving the indicator, a plurality of reference signals based on the association via a plurality of antenna panels using a plurality of precoding configurations, wherein the plurality of reference signals is associated with the one or more reference signal ports. For example, the communication component 222, the modem 220, and/or the processor 212 of the UE 110 may transmit the PTRS to the B S 105. The communication component 222 may send the PTRS to the transceiver 202 or the transmitter 208. The transceiver 202 or the transmitter 208 may convert the PTRS to electrical signals and send to the RF front end 288. The RF front end 288 may filter and/or amplify the electrical signals. The RF front end 288 may send the electrical signals as electromagnetic signals via the one or more antennas 265.

In certain implementations, the processor 212, the modem 220, the communication component 222, the transceiver 202, the receiver 206, the transmitter 208, the RF front end 288, and/or the subcomponents of the RF front end 288 may be configured to and/or may define means for transmitting, in response to receiving the indicator, a plurality of reference signals based on the association via a plurality of antenna panels using a plurality of precoding configurations, wherein the plurality of reference signals is associated with the one or more reference signal ports.

Additional Implementations

In an aspect, a method includes receiving an indicator for uplink transmission indicating at least an association between at least one of one or more first reference signal ports and at least one of one or more second reference signal ports for a plurality of precoding configurations, transmitting, in response to receiving the indicator, a plurality of first reference signals based on the association via a plurality of antenna panels using the plurality of precoding configurations, wherein the plurality of first reference signals is associated with the one or more first reference signal ports, and transmitting one or more second reference signals based on the association via the plurality of antenna panels using the plurality of precoding configurations, wherein the one or more second reference signals is associated with the one or more second reference signal ports.

Any of the methods above, wherein receiving the indicator further comprises receiving a first bit comprising a first bit value indicating whether a first port of the one or more first reference signal ports is associated with a first port of the one or more second reference signal ports for a first precoding configuration of the plurality of precoding configurations for a first layer of the uplink transmission and a second bit comprising a second bit value indicating whether the first port of the one or more first reference signal ports is associated with the first port of the one or more second reference signal ports for a second precoding configuration of the plurality of precoding configurations for the first layer of the uplink transmission.

Any of the methods above, wherein a first value of the first bit indicates that the first port of the one or more first reference signal ports is associated with the first port of the one or more second reference signal ports for the first precoding configuration of the plurality of precoding configurations for a second layer of the uplink transmission, a second value of the first bit indicates that a second port of the one or more first reference signal ports is associated with the first port of the one or more second reference signal ports for the first precoding configuration of the plurality of precoding configurations for the second layer of the uplink transmission, a first value of the second bit indicates that the first port of the one or more first reference signal ports is associated with the first port of the one or more second reference signal ports for the second precoding configuration of the plurality of precoding configurations for a second layer of the uplink transmission, and a second value of the second bit indicates that the second port of the one or more first reference signal ports is associated with the first port of the one or more second reference signal ports for the second precoding configuration of the plurality of precoding configurations for the second layer of the uplink transmission.

Any of the methods above, wherein the uplink transmission utilizes time division multiplexing.

Any of the methods above, wherein receiving the indicator further comprises receiving a first bit comprising a first bit value indicating whether a first port of the one or more first reference signal ports is associated with a first port of the one or more second reference signal ports for a first precoding configuration of the plurality of precoding configurations for a first layer of the uplink transmission and a second bit comprising a second bit value indicating whether the first port of the one or more first reference signal ports is associated with a second port of the one or more second reference signal ports for a second precoding configuration of the plurality of precoding configurations for the first layer of the uplink transmission.

Any of the methods above, wherein a first value of the first bit indicates that the first port of the one or more first reference signal ports is associated with the first port of the one or more second reference signal ports for the first precoding configuration of the plurality of precoding configurations for a second layer of the uplink transmission, a second value of the first bit indicates that a second port of the one or more first reference signal ports is associated with the first port of the one or more second reference signal ports for the first precoding configuration of the plurality of precoding configurations for the second layer of the uplink transmission, a first value of the second bit indicates that the first port of the one or more first reference signal ports is associated with a second port of the one or more second reference signal ports for the second precoding configuration of the plurality of precoding configurations for a second layer of the uplink transmission, a second value of the second bit indicates that the second port of the one or more first reference signal ports is associated with the second port of the one or more second reference signal ports for the second precoding configuration of the plurality of precoding configurations for the second layer of the uplink transmission.

Any of the methods above, wherein the uplink transmission utilizes frequency division multiplexing.

Any of the methods above, wherein a first value of the first bit indicates that the first port of the one or more first reference signal ports is associated with the first port of the one or more second reference signal ports for the first precoding configuration of the plurality of precoding configurations for a second layer of the uplink transmission, a second value of the first bit indicates that a second port of the one or more first reference signal ports is associated with the first port of the one or more second reference signal ports for the first precoding configuration of the plurality of precoding configurations for the second layer of the uplink transmission, a first value of the second bit indicates that the first port of the one or more first reference signal ports is associated with a second port of the one or more second reference signal ports for the second precoding configuration of the plurality of precoding configurations for a second layer of the uplink transmission, and a second value of the second bit indicates that the second port of the one or more first reference signal ports is associated with the second port of the one or more second reference signal ports for the second precoding configuration of the plurality of precoding configurations for the second layer of the uplink transmission.

Any of the methods above, wherein the uplink transmission utilizes frequency division multiplexing.

In some aspects, a UE may include a memory comprising instructions, a transceiver, and one or more processors operatively coupled with the memory and the transceiver, the one or more processors configured to execute instructions in the memory to receive, via the transceiver, an indicator for uplink transmission indicating at least an association between at least one of one or more first reference signal ports and at least one of one or more second reference signal ports for a plurality of precoding configurations, transmit, via the transceiver, in response to receiving the indicator, a plurality of first reference signals based on the association via a plurality of antenna panels using the plurality of precoding configurations, wherein the plurality of first reference signals is associated with the one or more first reference signal ports, and transmit, via the transceiver, one or more second reference signals based on the association via the plurality of antenna panels using the plurality of precoding configurations, wherein the one or more second reference signals is associated with the one or more second reference signal ports.

Any of the UEs above, wherein receiving the indicator further comprises receiving a first bit comprising a first bit value indicating whether a first port of the one or more first reference signal ports is associated with a first port of the one or more second reference signal ports for a first precoding configuration of the plurality of precoding configurations for a first layer of the uplink transmission and a second bit comprising a second bit value indicating whether the first port of the one or more first reference signal ports is associated with the first port of the one or more second reference signal ports for a second precoding configuration of the plurality of precoding configurations for the first layer of the uplink transmission.

Any of the UEs above, wherein a first value of the first bit indicates that the first port of the one or more first reference signal ports is associated with the first port of the one or more second reference signal ports for the first precoding configuration of the plurality of precoding configurations for a second layer of the uplink transmission, a second value of the first bit indicates that a second port of the one or more first reference signal ports is associated with the first port of the one or more second reference signal ports for the first precoding configuration of the plurality of precoding configurations for the second layer of the uplink transmission, a first value of the second bit indicates that the first port of the one or more first reference signal ports is associated with the first port of the one or more second reference signal ports for the second precoding configuration of the plurality of precoding configurations for the second layer of the uplink transmission, and a second value of the second bit indicates that the second port of the one or more first reference signal ports is associated with the first port of the one or more second reference signal ports for the second precoding configuration of the plurality of precoding configurations for the second layer of the uplink transmission.

Any of the UEs above, wherein the uplink transmission utilizes time division multiplexing.

Any of the UEs above, wherein receiving the indicator further comprises receiving a first bit comprising a first bit value indicating whether a first port of the one or more first reference signal ports is associated with a first port of the one or more second reference signal ports for a first precoding configuration of the plurality of precoding configurations for a first layer of the uplink transmission and a second bit comprising a second bit value indicating whether the first port of the one or more first reference signal ports is associated with a second port of the one or more second reference signal ports for a second precoding configuration of the plurality of precoding configurations for the first layer of the uplink transmission.

Any of the UEs above, wherein a first value of the first bit indicates that the first port of the one or more first reference signal ports is associated with the first port of the one or more second reference signal ports for the first precoding configuration of the plurality of precoding configurations for a second layer of the uplink transmission, a second value of the first bit indicates that a second port of the one or more first reference signal ports is associated with the first port of the one or more second reference signal ports for the first precoding configuration of the plurality of precoding configurations for the second layer of the uplink transmission, a first value of the second bit indicates that the first port of the one or more first reference signal ports is associated with a second port of the one or more second reference signal ports for the second precoding configuration of the plurality of precoding configurations for a second layer of the uplink transmission, a second value of the second bit indicates that the second port of the one or more first reference signal ports is associated with the second port of the one or more second reference signal ports for the second precoding configuration of the plurality of precoding configurations for the second layer of the uplink transmission.

Any of the UEs above, wherein the uplink transmission utilizes frequency division multiplexing.

Any of the UEs above, wherein a first value of the first bit indicates that the first port of the one or more first reference signal ports is associated with the first port of the one or more second reference signal ports for the first precoding configuration of the plurality of precoding configurations for a second layer of the uplink transmission, a second value of the first bit indicates that a second port of the one or more first reference signal ports is associated with the first port of the one or more second reference signal ports for the first precoding configuration of the plurality of precoding configurations for the second layer of the uplink transmission, a first value of the second bit indicates that the first port of the one or more first reference signal ports is associated with a second port of the one or more second reference signal ports for the second precoding configuration of the plurality of precoding configurations for a second layer of the uplink transmission, and a second value of the second bit indicates that the second port of the one or more first reference signal ports is associated with the second port of the one or more second reference signal ports for the second precoding configuration of the plurality of precoding configurations for the second layer of the uplink transmission.

Any of the UEs above, wherein the uplink transmission utilizes frequency division multiplexing.

In certain aspects, a non-transitory computer readable medium having instructions stored therein that, when executed by one or more processors of a user equipment (UE), cause the one or more processors to receive an indicator for uplink transmission indicating at least an association between at least one of one or more first reference signal ports and at least one of one or more second reference signal ports for a plurality of precoding configurations, transmit, in response to receiving the indicator, a plurality of first reference signals based on the association via a plurality of antenna panels using the plurality of precoding configurations, wherein the plurality of first reference signals is associated with the one or more first reference signal ports, and transmit one or more second reference signals based on the association via the plurality of antenna panels using the plurality of precoding configurations, wherein the one or more second reference signals is associated with the one or more second reference signal ports.

Any of the non-transitory computer readable media above, wherein the instructions for receiving the indicator further comprises instructions that, when executed by the one or more processors, cause the one or more processors to receive a first bit comprising a first bit value indicating whether a first port of the one or more first reference signal ports is associated with a first port of the one or more second reference signal ports for a first precoding configuration of the plurality of precoding configurations for a first layer of the uplink transmission and a second bit comprising a second bit value indicating whether the first port of the one or more first reference signal ports is associated with the first port of the one or more second reference signal ports for a second precoding configuration of the plurality of precoding configurations for the first layer of the uplink transmission.

Any of the non-transitory computer readable media above, wherein a first value of the first bit indicates that the first port of the one or more first reference signal ports is associated with the first port of the one or more second reference signal ports for the first precoding configuration of the plurality of precoding configurations for a second layer of the uplink transmission, a second value of the first bit indicates that a second port of the one or more first reference signal ports is associated with the first port of the one or more second reference signal ports for the first precoding configuration of the plurality of precoding configurations for the second layer of the uplink transmission, a first value of the second bit indicates that the first port of the one or more first reference signal ports is associated with the first port of the one or more second reference signal ports for the second precoding configuration of the plurality of precoding configurations for a second layer of the uplink transmission, and a second value of the second bit indicates that the second port of the one or more first reference signal ports is associated with the first port of the one or more second reference signal ports for the second precoding configuration of the plurality of precoding configurations for the second layer of the uplink transmission.

Any of the non-transitory computer readable media above, wherein the uplink transmission utilizes time division multiplexing.

Any of the non-transitory computer readable media above, wherein the instructions for receiving the indicator further comprises instructions that, when executed by the one or more processors, cause the one or more processors to receive a first bit comprising a first bit value indicating whether a first port of the one or more first reference signal ports is associated with a first port of the one or more second reference signal ports for a first precoding configuration of the plurality of precoding configurations for a first layer of the uplink transmission and a second bit comprising a second bit value indicating whether the first port of the one or more first reference signal ports is associated with a second port of the one or more second reference signal ports for a second precoding configuration of the plurality of precoding configurations for the first layer of the uplink transmission.

Any of the non-transitory computer readable media above, wherein a first value of the first bit indicates that the first port of the one or more first reference signal ports is associated with the first port of the one or more second reference signal ports for the first precoding configuration of the plurality of precoding configurations for a second layer of the uplink transmission, a second value of the first bit indicates that a second port of the one or more first reference signal ports is associated with the first port of the one or more second reference signal ports for the first precoding configuration of the plurality of precoding configurations for the second layer of the uplink transmission, a first value of the second bit indicates that the first port of the one or more first reference signal ports is associated with a second port of the one or more second reference signal ports for the second precoding configuration of the plurality of precoding configurations for a second layer of the uplink transmission, a second value of the second bit indicates that the second port of the one or more first reference signal ports is associated with the second port of the one or more second reference signal ports for the second precoding configuration of the plurality of precoding configurations for the second layer of the uplink transmission.

Any of the non-transitory computer readable media above, wherein the uplink transmission utilizes frequency division multiplexing.

Any of the non-transitory computer readable media above, wherein a first value of the first bit indicates that the first port of the one or more first reference signal ports is associated with the first port of the one or more second reference signal ports for the first precoding configuration of the plurality of precoding configurations for a second layer of the uplink transmission, a second value of the first bit indicates that a second port of the one or more first reference signal ports is associated with the first port of the one or more second reference signal ports for the first precoding configuration of the plurality of precoding configurations for the second layer of the uplink transmission, a first value of the second bit indicates that the first port of the one or more first reference signal ports is associated with a second port of the one or more second reference signal ports for the second precoding configuration of the plurality of precoding configurations for a second layer of the uplink transmission, and a second value of the second bit indicates that the second port of the one or more first reference signal ports is associated with the second port of the one or more second reference signal ports for the second precoding configuration of the plurality of precoding configurations for the second layer of the uplink transmission.

Any of the non-transitory computer readable media above, wherein the uplink transmission utilizes frequency division multiplexing.

In an aspect, a UE includes means for receiving an indicator for uplink transmission indicating at least an association between at least one of one or more first reference signal ports and at least one of one or more second reference signal ports for a plurality of precoding configurations, means for transmitting, in response to receiving the indicator, a plurality of first reference signals based on the association via a plurality of antenna panels using the plurality of precoding configurations, wherein the plurality of first reference signals is associated with the one or more first reference signal ports, and means for transmitting one or more second reference signals based on the association via the plurality of antenna panels using the plurality of precoding configurations, wherein the one or more second reference signals is associated with the one or more second reference signal ports.

Any of the UEs above, wherein means for receiving the indicator further comprises means for receiving a first bit comprising a first bit value indicating whether a first port of the one or more first reference signal ports is associated with a first port of the one or more second reference signal ports for a first precoding configuration of the plurality of precoding configurations for a first layer of the uplink transmission and a second bit comprising a second bit value indicating whether the first port of the one or more first reference signal ports is associated with the first port of the one or more second reference signal ports for a second precoding configuration of the plurality of precoding configurations for the first layer of the uplink transmission.

Any of the UEs above, wherein a first value of the first bit indicates that the first port of the one or more first reference signal ports is associated with the first port of the one or more second reference signal ports for the first precoding configuration of the plurality of precoding configurations for a second layer of the uplink transmission, a second value of the first bit indicates that a second port of the one or more first reference signal ports is associated with the first port of the one or more second reference signal ports for the first precoding configuration of the plurality of precoding configurations for the second layer of the uplink transmission, a first value of the second bit indicates that the first port of the one or more first reference signal ports is associated with the first port of the one or more second reference signal ports for the second precoding configuration of the plurality of precoding configurations for a second layer of the uplink transmission, and a second value of the second bit indicates that the second port of the one or more first reference signal ports is associated with the first port of the one or more second reference signal ports for the second precoding configuration of the plurality of precoding configurations for the second layer of the uplink transmission.

Any of the UEs above, wherein the uplink transmission utilizes time division multiplexing.

Any of the UEs above, wherein means for receiving the indicator further comprises means for receiving a first bit comprising a first bit value indicating whether a first port of the one or more first reference signal ports is associated with a first port of the one or more second reference signal ports for a first precoding configuration of the plurality of precoding configurations for a first layer of the uplink transmission and a second bit comprising a second bit value indicating whether the first port of the one or more first reference signal ports is associated with a second port of the one or more second reference signal ports for a second precoding configuration of the plurality of precoding configurations for the first layer of the uplink transmission.

Any of the UEs above, wherein a first value of the first bit indicates that the first port of the one or more first reference signal ports is associated with the first port of the one or more second reference signal ports for the first precoding configuration of the plurality of precoding configurations for a second layer of the uplink transmission, a second value of the first bit indicates that a second port of the one or more first reference signal ports is associated with the first port of the one or more second reference signal ports for the first precoding configuration of the plurality of precoding configurations for the second layer of the uplink transmission, a first value of the second bit indicates that the first port of the one or more first reference signal ports is associated with a second port of the one or more second reference signal ports for the second precoding configuration of the plurality of precoding configurations for a second layer of the uplink transmission, a second value of the second bit indicates that the second port of the one or more first reference signal ports is associated with the second port of the one or more second reference signal ports for the second precoding configuration of the plurality of precoding configurations for the second layer of the uplink transmission.

Any of the UEs above, wherein the uplink transmission utilizes frequency division multiplexing.

Any of the UEs above, wherein a first value of the first bit indicates that the first port of the one or more first reference signal ports is associated with the first port of the one or more second reference signal ports for the first precoding configuration of the plurality of precoding configurations for a second layer of the uplink transmission, a second value of the first bit indicates that a second port of the one or more first reference signal ports is associated with the first port of the one or more second reference signal ports for the first precoding configuration of the plurality of precoding configurations for the second layer of the uplink transmission, a first value of the second bit indicates that the first port of the one or more first reference signal ports is associated with a second port of the one or more second reference signal ports for the second precoding configuration of the plurality of precoding configurations for a second layer of the uplink transmission, and a second value of the second bit indicates that the second port of the one or more first reference signal ports is associated with the second port of the one or more second reference signal ports for the second precoding configuration of the plurality of precoding configurations for the second layer of the uplink transmission.

Any of the UEs above, wherein the uplink transmission utilizes frequency division multiplexing.

In an aspect, a method includes transmitting an indicator for uplink transmission indicating at least an association between at least one of one or more first reference signal ports and at least one of one or more second reference signal ports for a plurality of precoding configurations, receiving, in response to transmitting the indicator, a plurality of first reference signals based on the association via a plurality of antenna panels using the plurality of precoding configurations, wherein the plurality of first reference signals is associated with the one or more first reference signal ports, and receiving one or more second reference signals based on the association via the plurality of antenna panels using the plurality of precoding configurations, wherein the one or more second reference signals is associated with the one or more second reference signal ports.

Any of the methods above, wherein transmitting the indicator further comprises transmitting a first bit indicating whether a first port of the one or more first reference signal ports is associated with a first port of the one or more second reference signal ports for a first precoding configuration of the plurality of precoding configurations for a first layer of the uplink transmission and a second bit comprising a second bit value indicating whether the first port of the one or more first reference signal ports is associated with the first port of the one or more second reference signal ports for a second precoding configuration of the plurality of precoding configurations for the first layer of the uplink transmission.

Any of the methods above, wherein a first value of the first bit indicates that the first port of the one or more first reference signal ports is associated with the first port of the one or more second reference signal ports for the first precoding configuration of the plurality of precoding configurations for a second layer of the uplink transmission, a second value of the first bit indicates that a second port of the one or more first reference signal ports is associated with the first port of the one or more second reference signal ports for the first precoding configuration of the plurality of precoding configurations for the second layer of the uplink transmission, a first value of the second bit indicates that the first port of the one or more first reference signal ports is associated with the first port of the one or more second reference signal ports for the second precoding configuration of the plurality of precoding configurations for a second layer of the uplink transmission, and a second value of the second bit indicates that the second port of the one or more first reference signal ports is associated with the first port of the one or more second reference signal ports for the second precoding configuration of the plurality of precoding configurations for the second layer of the uplink transmission.

Any of the methods above, wherein the uplink transmission utilizes time division multiplexing.

Any of the methods above, wherein transmitting the indicator further comprises transmitting a first bit indicating whether a first port of the one or more first reference signal ports is associated with a first port of the one or more second reference signal ports for a first precoding configuration of the plurality of precoding configurations for a first layer of the uplink transmission and a second bit comprising a second bit value indicating whether the first port of the one or more first reference signal ports is associated with a second port of the one or more second reference signal ports for a second precoding configuration of the plurality of precoding configurations for the first layer of the uplink transmission.

Any of the methods above, wherein a first value of the first bit indicates that the first port of the one or more first reference signal ports is associated with the first port of the one or more second reference signal ports for the first precoding configuration of the plurality of precoding configurations for a second layer of the uplink transmission, a second value of the first bit indicates that a second port of the one or more first reference signal ports is associated with the first port of the one or more second reference signal ports for the first precoding configuration of the plurality of precoding configurations for the second layer of the uplink transmission, a first value of the second bit indicates that the first port of the one or more first reference signal ports is associated with a second port of the one or more second reference signal ports for the second precoding configuration of the plurality of precoding configurations for a second layer of the uplink transmission, a second value of the second bit indicates that the second port of the one or more first reference signal ports is associated with the second port of the one or more second reference signal ports for the second precoding configuration of the plurality of precoding configurations for the second layer of the uplink transmission.

Any of the methods above, wherein the uplink transmission utilizes frequency division multiplexing.

Any of the methods above, wherein a first value of the first bit indicates that the first port of the one or more first reference signal ports is associated with the first port of the one or more second reference signal ports for the first precoding configuration of the plurality of precoding configurations for a second layer of the uplink transmission, a second value of the first bit indicates that a second port of the one or more first reference signal ports is associated with the first port of the one or more second reference signal ports for the first precoding configuration of the plurality of precoding configurations for the second layer of the uplink transmission, a first value of the second bit indicates that the first port of the one or more first reference signal ports is associated with a second port of the one or more second reference signal ports for the second precoding configuration of the plurality of precoding configurations for a second layer of the uplink transmission, and a second value of the second bit indicates that the second port of the one or more first reference signal ports is associated with the second port of the one or more second reference signal ports for the second precoding configuration of the plurality of precoding configurations for the second layer of the uplink transmission.

Any of the methods above, wherein the uplink transmission utilizes frequency division multiplexing.

In an aspect, a method includes transmitting an indicator for uplink transmission indicating at least an association between at least one of one or more first reference signal ports and at least one of one or more second reference signal ports for a plurality of precoding configurations, receiving, in response to transmitting the indicator, a plurality of first reference signals based on the association via a plurality of antenna panels using the plurality of precoding configurations, wherein the plurality of first reference signals is associated with the one or more first reference signal ports, and receiving one or more second reference signals based on the association via the plurality of antenna panels using the plurality of precoding configurations, wherein the one or more second reference signals is associated with the one or more second reference signal ports.

Any of the methods above, wherein transmitting the indicator further comprises transmitting a first bit indicating whether a first port of the one or more first reference signal ports is associated with a first port of the one or more second reference signal ports for a first precoding configuration of the plurality of precoding configurations for a first layer of the uplink transmission and a second bit comprising a second bit value indicating whether the first port of the one or more first reference signal ports is associated with the first port of the one or more second reference signal ports for a second precoding configuration of the plurality of precoding configurations for the first layer of the uplink transmission.

Any of the methods above, wherein a first value of the first bit indicates that the first port of the one or more first reference signal ports is associated with the first port of the one or more second reference signal ports for the first precoding configuration of the plurality of precoding configurations for a second layer of the uplink transmission, a second value of the first bit indicates that a second port of the one or more first reference signal ports is associated with the first port of the one or more second reference signal ports for the first precoding configuration of the plurality of precoding configurations for the second layer of the uplink transmission, a first value of the second bit indicates that the first port of the one or more first reference signal ports is associated with the first port of the one or more second reference signal ports for the second precoding configuration of the plurality of precoding configurations for a second layer of the uplink transmission, and a second value of the second bit indicates that the second port of the one or more first reference signal ports is associated with the first port of the one or more second reference signal ports for the second precoding configuration of the plurality of precoding configurations for the second layer of the uplink transmission.

Any of the methods above, wherein the uplink transmission utilizes time division multiplexing.

Any of the methods above, wherein transmitting the indicator further comprises transmitting a first bit indicating whether a first port of the one or more first reference signal ports is associated with a first port of the one or more second reference signal ports for a first precoding configuration of the plurality of precoding configurations for a first layer of the uplink transmission and a second bit comprising a second bit value indicating whether the first port of the one or more first reference signal ports is associated with a second port of the one or more second reference signal ports for a second precoding configuration of the plurality of precoding configurations for the first layer of the uplink transmission.

Any of the methods above, wherein a first value of the first bit indicates that the first port of the one or more first reference signal ports is associated with the first port of the one or more second reference signal ports for the first precoding configuration of the plurality of precoding configurations for a second layer of the uplink transmission, a second value of the first bit indicates that a second port of the one or more first reference signal ports is associated with the first port of the one or more second reference signal ports for the first precoding configuration of the plurality of precoding configurations for the second layer of the uplink transmission, a first value of the second bit indicates that the first port of the one or more first reference signal ports is associated with a second port of the one or more second reference signal ports for the second precoding configuration of the plurality of precoding configurations for a second layer of the uplink transmission, a second value of the second bit indicates that the second port of the one or more first reference signal ports is associated with the second port of the one or more second reference signal ports for the second precoding configuration of the plurality of precoding configurations for the second layer of the uplink transmission.

Any of the methods above, wherein the uplink transmission utilizes frequency division multiplexing.

Any of the methods above, wherein a first value of the first bit indicates that the first port of the one or more first reference signal ports is associated with the first port of the one or more second reference signal ports for the first precoding configuration of the plurality of precoding configurations for a second layer of the uplink transmission, a second value of the first bit indicates that a second port of the one or more first reference signal ports is associated with the first port of the one or more second reference signal ports for the first precoding configuration of the plurality of precoding configurations for the second layer of the uplink transmission, a first value of the second bit indicates that the first port of the one or more first reference signal ports is associated with a second port of the one or more second reference signal ports for the second precoding configuration of the plurality of precoding configurations for a second layer of the uplink transmission, and a second value of the second bit indicates that the second port of the one or more first reference signal ports is associated with the second port of the one or more second reference signal ports for the second precoding configuration of the plurality of precoding configurations for the second layer of the uplink transmission.

In an aspect of the present disclosure, a method includes receiving an indicator for a plurality of uplink transmissions indicating at least an association between at least one of one or more reference signal ports and the plurality of uplink transmissions and transmitting, in response to receiving the indicator, a plurality of reference signals based on the association via a plurality of antenna panels using a plurality of precoding configurations, wherein the plurality of reference signals is associated with the one or more reference signal ports.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication by a user equipment (UE), comprising:
    receiving an indicator for uplink transmission indicating at least an association between at least one of one or more first reference signal ports and at least one of one or more second reference signal ports for a plurality of precoding configurations, wherein receiving the indicator further comprises receiving a first bit comprising a first bit value indicating whether a first port of the one or more first reference signal ports is associated with a first port of the one or more second reference signal ports for a first precoding configuration of the plurality of precoding configurations for a first layer of the uplink transmission, and a second bit comprising a second bit value indicating whether the first port of the one or more first reference signal ports is associated with the first port or a second port of the one or more second reference signal ports for a second precoding configuration of the plurality of precoding configurations for the first layer of the uplink transmission;
    transmitting, in response to receiving the indicator, a plurality of first reference signals based on the association via a plurality of antenna panels using the plurality of precoding configurations, wherein the plurality of first reference signals is associated with the one or more first reference signal ports; and
    transmitting one or more second reference signals based on the association via the plurality of antenna panels using the plurality of precoding configurations, wherein the one or more second reference signals is associated with the one or more second reference signal ports.

2. The method of claim 1, wherein:
    a first value of the first bit indicates that the first port of the one or more first reference signal ports is associated with the first port of the one or more second reference signal ports for the first precoding configuration of the plurality of precoding configurations for a second layer of the uplink transmission;
    a second value of the first bit indicates that a second port of the one or more first reference signal ports is associated with the first port of the one or more second reference signal ports for the first precoding configuration of the plurality of precoding configurations for the second layer of the uplink transmission;
    a first value of the second bit indicates that the first port of the one or more first reference signal ports is associated with the first port of the one or more second reference signal ports for the second precoding configuration of the plurality of precoding configurations for a second layer of the uplink transmission; and
    a second value of the second bit indicates that the second port of the one or more first reference signal ports is associated with the first port of the one or more second reference signal ports for the second precoding configuration of the plurality of precoding configurations for the second layer of the uplink transmission.

3. The method of claim 2, wherein the uplink transmission utilizes time division multiplexing.

4. The method of claim 1, wherein:
a first value of the first bit indicates that the first port of the one or more first reference signal ports is associated with the first port of the one or more second reference signal ports for the first precoding configuration of the plurality of precoding configurations for a second layer of the uplink transmission;
a second value of the first bit indicates that a second port of the one or more first reference signal ports is associated with the first port of the one or more second reference signal ports for the first precoding configuration of the plurality of precoding configurations for the second layer of the uplink transmission;
a first value of the second bit indicates that the first port of the one or more first reference signal ports is associated with a second port of the one or more second reference signal ports for the second precoding configuration of the plurality of precoding configurations for a second layer of the uplink transmission; and
a second value of the second bit indicates that the second port of the one or more first reference signal ports is associated with the second port of the one or more second reference signal ports for the second precoding configuration of the plurality of precoding configurations for the second layer of the uplink transmission.

5. The method of claim 4, wherein the uplink transmission utilizes frequency division multiplexing.

6. The method of claim 1, wherein:
a first value of the first bit indicates that the first port of the one or more first reference signal ports is associated with the first port of the one or more second reference signal ports for the first precoding configuration of the plurality of precoding configurations for a second layer of the uplink transmission;
a second value of the first bit indicates that a second port of the one or more first reference signal ports is associated with the first port of the one or more second reference signal ports for the first precoding configuration of the plurality of precoding configurations for the second layer of the uplink transmission;
a first value of the second bit indicates that the first port of the one or more first reference signal ports is associated with a second port of the one or more second reference signal ports for the second precoding configuration of the plurality of precoding configurations for a second layer of the uplink transmission; and
a second value of the second bit indicates that the second port of the one or more first reference signal ports is associated with the second port of the one or more second reference signal ports for the second precoding configuration of the plurality of precoding configurations for the second layer of the uplink transmission.

7. The method of claim 6, wherein the uplink transmission utilizes frequency division multiplexing.

8. A user equipment (UE), comprising:
a memory comprising instructions;
a transceiver; and
one or more processors operatively coupled with the memory and the transceiver, the one or more processors configured to execute instructions in the memory to:
receive, via the transceiver, an indicator for uplink transmission indicating at least an association between at least one of one or more first reference signal ports and at least one of one or more second reference signal ports for a plurality of precoding configurations, wherein receiving the indicator further comprises receiving a first bit comprising a first bit value indicating whether a first port of the one or more first reference signal ports is associated with a first port of the one or more second reference signal ports for a first precoding configuration of the plurality of precoding configurations for a first layer of the uplink transmission, and a second bit comprising a second bit value indicating whether the first port of the one or more first reference signal ports is associated with the first port or a second port of the one or more second reference signal ports for a second precoding configuration of the plurality of precoding configurations for the first layer of the uplink transmission;
transmit, via the transceiver, in response to receiving the indicator, a plurality of first reference signals via a plurality of antenna panels using the plurality of precoding configurations, wherein the plurality of first reference signals is associated with the one or more first reference signal ports; and
transmit, via the transceiver, one or more second reference signals based on the association via the plurality of antenna panels using the plurality of precoding configurations, wherein the one or more second reference signals is associated with the one or more second reference signal ports.

9. The UE of claim 8, wherein:
a first value of the first bit indicates that the first port of the one or more first reference signal ports is associated with the first port of the one or more second reference signal ports for the first precoding configuration of the plurality of precoding configurations for a second layer of the uplink transmission;
a second value of the first bit indicates that a second port of the one or more first reference signal ports is associated with the first port of the one or more second reference signal ports for the first precoding configuration of the plurality of precoding configurations for the second layer of the uplink transmission;
a first value of the second bit indicates that the first port of the one or more first reference signal ports is associated with the first port of the one or more second reference signal ports for the second precoding configuration of the plurality of precoding configurations for a second layer of the uplink transmission; and
a second value of the second bit indicates that the second port of the one or more first reference signal ports is associated with the first port of the one or more second reference signal ports for the second precoding configuration of the plurality of precoding configurations for the second layer of the uplink transmission.

10. The UE of claim 9, wherein the uplink transmission utilizes time division multiplexing.

11. The UE of claim 8, wherein:
a first value of the first bit indicates that the first port of the one or more first reference signal ports is associated with the first port of the one or more second reference signal ports for the first precoding configuration of the plurality of precoding configurations for a second layer of the uplink transmission;
a second value of the first bit indicates that a second port of the one or more first reference signal ports is associated with the first port of the one or more second reference signal ports for the first precoding configuration of the plurality of precoding configurations for the second layer of the uplink transmission;

a first value of the second bit indicates that the first port of the one or more first reference signal ports is associated with a second port of the one or more second reference signal ports for the second precoding configuration of the plurality of precoding configurations for a second layer of the uplink transmission; and a second value of the second bit indicates that the second port of the one or more first reference signal ports is associated with the second port of the one or more second reference signal ports for the second precoding configuration of the plurality of precoding configurations for the second layer of the uplink transmission.

12. The UE of claim 11, wherein the uplink transmission utilizes frequency division multiplexing.

13. The UE of claim 8, wherein:

a first value of the first bit indicates that the first port of the one or more first reference signal ports is associated with the first port of the one or more second reference signal ports for the first precoding configuration of the plurality of precoding configurations for a second layer of the uplink transmission;

a second value of the first bit indicates that a second port of the one or more first reference signal ports is associated with the first port of the one or more second reference signal ports for the first precoding configuration of the plurality of precoding configurations for the second layer of the uplink transmission;

a first value of the second bit indicates that the first port of the one or more first reference signal ports is associated with a second port of the one or more second reference signal ports for the second precoding configuration of the plurality of precoding configurations for a second layer of the uplink transmission; and a second value of the second bit indicates that the second port of the one or more first reference signal ports is associated with the second port of the one or more second reference signal ports for the second precoding configuration of the plurality of precoding configurations for the second layer of the uplink transmission.

14. The UE of claim 13, wherein the uplink transmission utilizes frequency division multiplexing.

15. A non-transitory computer readable medium having instructions stored therein that, when executed by one or more processors of a user equipment (UE), cause the one or more processors to:

receive an indicator for uplink transmission indicating at least an association between at least one of one or more first reference signal ports and at least one of one or more second reference signal ports for a plurality of precoding configurations, wherein receiving the indicator further comprises receiving a first bit comprising a first bit value indicating whether a first port of the one or more first reference signal ports is associated with a first port of the one or more second reference signal ports for a first precoding configuration of the plurality of precoding configurations for a first layer of the uplink transmission, and a second bit comprising a second bit value indicating whether the first port of the one or more first reference signal ports is associated with the first port or a second port of the one or more second reference signal ports for a second precoding configuration of the plurality of precoding configurations for the first layer of the uplink transmission;

transmit, in response to receiving the indicator, a plurality of first reference signals via a plurality of antenna panels using the plurality of precoding configurations, wherein the plurality of first reference signals is associated with the one or more first reference signal ports; and transmit one or more second reference signals based on the association via the plurality of antenna panels using the plurality of precoding configurations, wherein the one or more second reference signals is associated with the one or more second reference signal ports.

16. The non-transitory computer readable medium of claim 15, wherein:

a first value of the first bit indicates that the first port of the one or more first reference signal ports is associated with the first port of the one or more second reference signal ports for the first precoding configuration of the plurality of precoding configurations for a second layer of the uplink transmission;

a second value of the first bit indicates that a second port of the one or more first reference signal ports is associated with the first port of the one or more second reference signal ports for the first precoding configuration of the plurality of precoding configurations for the second layer of the uplink transmission;

a first value of the second bit indicates that the first port of the one or more first reference signal ports is associated with the first port of the one or more second reference signal ports for the second precoding configuration of the plurality of precoding configurations for a second layer of the uplink transmission; and a second value of the second bit indicates that the second port of the one or more first reference signal ports is associated with the first port of the one or more second reference signal ports for the second precoding configuration of the plurality of precoding configurations for the second layer of the uplink transmission.

17. The non-transitory computer readable medium of claim 16, wherein the uplink transmission utilizes time division multiplexing.

18. The non-transitory computer readable medium of claim 15, wherein:

a first value of the first bit indicates that the first port of the one or more first reference signal ports is associated with the first port of the one or more second reference signal ports for the first precoding configuration of the plurality of precoding configurations for a second layer of the uplink transmission;

a second value of the first bit indicates that a second port of the one or more first reference signal ports is associated with the first port of the one or more second reference signal ports for the first precoding configuration of the plurality of precoding configurations for the second layer of the uplink transmission;

a first value of the second bit indicates that the first port of the one or more first reference signal ports is associated with a second port of the one or more second reference signal ports for the second precoding configuration of the plurality of precoding configurations for a second layer of the uplink transmission; and a second value of the second bit indicates that the second port of the one or more first reference signal ports is associated with the second port of the one or more second reference signal ports for the second precoding configuration of the plurality of precoding configurations for the second layer of the uplink transmission.

19. The non-transitory computer readable medium of claim 18, wherein the uplink transmission utilizes frequency division multiplexing.

20. The non-transitory computer readable medium of claim 15, wherein:
a first value of the first bit indicates that the first port of the one or more first reference signal ports is associated with the first port of the one or more second reference signal ports for the first precoding configuration of the plurality of precoding configurations for a second layer of the uplink transmission;
a second value of the first bit indicates that a second port of the one or more first reference signal ports is associated with the first port of the one or more second reference signal ports for the first precoding configuration of the plurality of precoding configurations for the second layer of the uplink transmission;
a first value of the second bit indicates that the first port of the one or more first reference signal ports is associated with a second port of the one or more second reference signal ports for the second precoding configuration of the plurality of precoding configurations for a second layer of the uplink transmission; and
a second value of the second bit indicates that the second port of the one or more first reference signal ports is associated with the second port of the one or more second reference signal ports for the second precoding configuration of the plurality of precoding configurations for the second layer of the uplink transmission.

21. The non-transitory computer readable medium of claim 20, wherein the uplink transmission utilizes frequency division multiplexing.

22. A user equipment (UE), comprising:
means for receiving an indicator for uplink transmission indicating at least an association between at least one of one or more first reference signal ports and at least one of one or more second reference signal ports for a plurality of precoding configurations, wherein receiving the indicator further comprises receiving a first bit comprising a first bit value indicating whether a first port of the one or more first reference signal ports is associated with a first port of the one or more second reference signal ports for a first precoding configuration of the plurality of precoding configurations for a first layer of the uplink transmission, and a second bit comprising a second bit value indicating whether the first port of the one or more first reference signal ports is associated with the first port or a second port of the one or more second reference signal ports for a second precoding configuration of the plurality of precoding configurations for the first layer of the uplink transmission;
means for transmitting, in response to receiving the indicator, a plurality of first reference signals via a plurality of antenna panels using the plurality of precoding configurations, wherein the plurality of first reference signals is associated with the one or more first reference signal ports; and
means for transmitting one or more second reference signals based on the association via the plurality of antenna panels using the plurality of precoding configurations, wherein the one or more second reference signals is associated with the one or more second reference signal ports.

23. The UE of claim 22, wherein:
a first value of the first bit indicates that the first port of the one or more first reference signal ports is associated with the first port of the one or more second reference signal ports for the first precoding configuration of the plurality of precoding configurations for a second layer of the uplink transmission;
a second value of the first bit indicates that a second port of the one or more first reference signal ports is associated with the first port of the one or more second reference signal ports for the first precoding configuration of the plurality of precoding configurations for the second layer of the uplink transmission;
a first value of the second bit indicates that the first port of the one or more first reference signal ports is associated with the first port of the one or more second reference signal ports for the second precoding configuration of the plurality of precoding configurations for a second layer of the uplink transmission; and
a second value of the second bit indicates that the second port of the one or more first reference signal ports is associated with the first port of the one or more second reference signal ports for the second precoding configuration of the plurality of precoding configurations for the second layer of the uplink transmission.

* * * * *